(12) United States Patent
Inagaki

(10) Patent No.: US 7,345,801 B2
(45) Date of Patent: Mar. 18, 2008

(54) LASER SCANNING DEVICE

(75) Inventor: Yoshihiro Inagaki, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 184 days.

(21) Appl. No.: 11/019,733

(22) Filed: Dec. 23, 2004

(65) Prior Publication Data

US 2006/0050347 A1  Mar. 9, 2006

(30) Foreign Application Priority Data

Sep. 7, 2004  (JP) ............... 2004-259312

(51) Int. Cl.
*G02B 26/08* (2006.01)
(52) U.S. Cl. ............... 359/205; 359/206; 359/207
(58) Field of Classification Search ........ 359/196–198, 359/204–207, 212, 216, 225, 231, 662, 668, 359/710, 796; 347/244; 346/108; 350/6.5, 350/6.8, 247, 416, 432, 434
See application file for complete search history.

(56) References Cited

U.S. PATENT DOCUMENTS

| | | | | |
|---|---|---|---|---|
| 4,379,612 A | * | 4/1983 | Matsuoka et al. | 359/218 |
| 4,674,825 A | * | 6/1987 | Tateoka et al. | 359/218 |
| 4,892,395 A | * | 1/1990 | Suzuki et al. | 359/641 |
| 4,971,411 A | * | 11/1990 | Takanashi | 359/206 |
| 5,111,219 A | * | 5/1992 | Makino | 347/259 |
| 5,270,851 A | * | 12/1993 | Makino et al. | 359/206 |
| 5,808,772 A | * | 9/1998 | Yamaguchi et al. | 359/204 |
| 6,437,897 B1 | * | 8/2002 | Inagaki | 359/205 |
| 7,068,410 B2 | * | 6/2006 | Nomura et al. | 359/225 |
| 2003/0011891 A1 | * | 1/2003 | Suzuki et al. | 359/668 |

FOREIGN PATENT DOCUMENTS

| | | |
|---|---|---|
| JP | 9-33843 A | 2/1997 |
| JP | 9-80348 A | 3/1997 |
| JP | 9-133887 A | 5/1997 |
| JP | 10-213775 A | 8/1998 |
| JP | 2002-182147 A | 6/2002 |
| JP | 2002-296524 A | 10/2002 |

* cited by examiner

*Primary Examiner*—Stephone B. Allen
*Assistant Examiner*—Jennifer L Doak
(74) *Attorney, Agent, or Firm*—Buchanan Ingersoll & Rooney PC

(57) ABSTRACT

Laser light, emitted from a laser light source, is formed into a converged light ray by a condensing lens, and deflected by a resonance mirror. The laser light is converged on a photosensitive member through a scanning lens including one negative lens, and has at least one nonaxisymmetric face that provides the same power in the vicinity of the light axis in both of a main scanning direction and a sub-scanning direction. Even when a deflection angle in the resonance mirror is small, it is possible to shorten a distance from the resonance mirror to the photosensitive member, which is required for providing a desired scanning width and to effectively carry out image-face curvature correction and groove-shaped aberration correction within a sub-scanning cross section and to reduce the size of a unit including the resonance mirror and the scanning lens.

15 Claims, 22 Drawing Sheets

POSITION WITHIN MAIN SCANNING
LIGHT RAY (RELATIVE VALUE)

POSITION WITHIN SUB-SCANNING
LIGHT RAY (RELATIVE VALUE)

TIME (RELATIVE VALUE TO CYCLE)

IMAGE HEIGHT (mm)

IMAGE HEIGHT (mm)

IMAGE HEIGHT (mm)

POSITION WITHIN MAIN SCANNING
LIGHT RAY (RELATIVE VALUE)

POSITION WITHIN SUB-SCANNING
LIGHT RAY (RELATIVE VALUE)

LASER SCANNING DEVICE

This application claims benefit of priority to Patent Application No. 2004-259312 filed in Japan on Sep. 7, 2004, the entire contents of which are incorporated by reference herein.

BACKGROUND OF THE INVENTION

1. Field of the Invention

The present invention relates to a laser scanning device.

2. Description of the Prior Art

In the field of conventional laser scanning devices, for example, JP-A 09-33843 (1997) has proposed a technique in which laser light, emitted by a semiconductor laser, is formed into parallel light rays by using a collimator lens, and these parallel light rays are then deflected by a resonance mirror and converged onto a photosensitive member by a scanning lens having an arcsine characteristic, so that the surface of the photosensitive member is scanned at a constant speed.

Here, the resonance mirror serving as a deflector has a deflection angle range that is smaller than that of a polygon mirror that also serves as a deflector, although it is beneficial in that the size is smaller than that of the polygon mirror. For this reason, in the conventional laser scanning device, the focal distance of the scanning lens needs to be lengthened in comparison with the case where a polygon mirror is used, in order to obtain a desirable scanning width, to cause a longer light path from the resonance mirror to the photosensitive member and the subsequent large size of the device.

Moreover, in order to achieve a laser scanning device with high precision, for example, it is necessary to effectively correct an image-face curvature, on a sub-scanning cross section.

SUMMARY OF THE INVENTION

The present invention has been devised to solve the above problems, and its object is to provide a small-size laser scanning device with high precision.

In order to achieve the above object, the laser scanning device of the present invention includes a laser light source, a condenser optical system through which laser light, emitted from the laser light source, is formed into a converged light ray, a deflector which deflects the converged light ray released from the condenser optical system, and a scanning optical system which condenses the laser light, deflected by the deflector, onto a surface to be scanned. Herein, the scanning optical system is constituted of one negative lens, and has at least one nonaxisymmetric face that provides the same power in the vicinity of the light axis in both of a main scanning direction and a sub-scanning direction.

With the above configuration, the laser light released from the laser light source is formed into a converged light ray through the condenser optical system and, then, is deflected by the deflector (e.g., resonance mirror). The laser light ray that has been deflected is condensed onto the scanning face to be scanned (e.g., photosensitive member) through the scanning lens.

In this case, the scanning optical system is constituted of the negative lens; therefore, even when the deflection angle in the deflector is small, it is possible to shorten the distance from the deflector to the face to be scanned, which is required for providing a desired scanning width. Moreover, since the scanning optical system is constituted of one negative lens and has at least one nonaxisymmetric face that provides the same power in the vicinity of the light axis in the main scanning direction and the sub-scanning direction, it becomes possible to effectively carry out image-face curvature correction and groove-shaped aberration correction within a sub-scanning cross section and, also, to reduce the size of its own unit including the deflector and the scanning optical system. Consequently, a small-size laser scanning device with high precision can be achieved.

DESCRIPTION OF THE DRAWINGS

These and other features and advantages of the invention will be made clearer hereinunder by description thereof given only by way of a non-limiting and illustrative example, with reference to the accompanying drawings, in which.

DESCRIPTION OF THE PREFERRED EMBODIMENT

Figure 1:
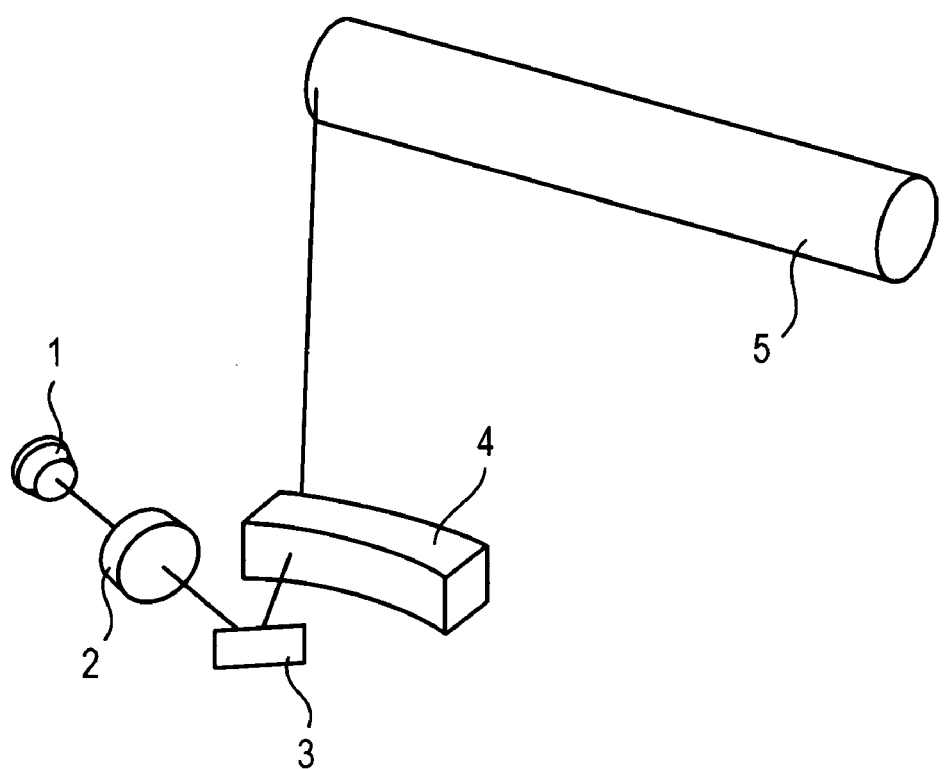
FIG. 1 is a perspective view that shows a schematic structure of a laser scanning device in accordance with one embodiment of the present invention.

Referring to the drawings, description will be given of one embodiment of the present invention.

FIG. 1 is a perspective view that shows a schematic structure of a laser scanning device in accordance with the present embodiment. This laser scanning device includes a laser light source 1, a condensing lens 2, a resonance mirror 3, a scanning lens 4 and a photosensitive member 5.

The laser light source 1 is a light source that releases laser light with almost linear polarization, and is constituted of, for example, a semiconductor laser. The condensing lens 2 constitutes a condensing optical system that forms laser light rays released from the laser light source 1 into a converged light ray. The resonance mirror 3, which serves as a deflector that deflects the converged light ray released from the condensing lens 2 to the main scanning direction, deflects the laser light by sine-wave rocking a reflection face.

The scanning lens 4 constitutes a scanning optical system that converges the laser light ray deflected by the resonance mirror 3 onto the photosensitive member 5 that serves as the face to be scanned. In the present embodiment, the scanning lens 4 is constituted of one negative lens that has a convex meniscus shape that extends toward the photosensitive member 5 side.

In the above structure, laser light rays released from the laser light source 1 are formed into a converged light ray through the condensing lens 2, then, are deflected to the main scanning direction by the resonance mirror 3, and are converged onto the photosensitive member 5 by the scanning lens 4. In other words, in the present embodiment, the converged light is made incident on the scanning lens 4. However, since the scanning lens 4 is constituted of the negative lens, the light ray, which is made incident on the scanning lens 4 through the resonance mirror 3, can be expanded to a desired scanning width, even when the distance from the resonance mirror 3 to the surface of the photosensitive member 5 is shortened. Therefore, even when the deflection angle in the resonance mirror 3 is small, it is possible to easily achieve a small-size laser scanning device.

Referring to respective examples and comparative example, description will be given of the laser scanning device of the present invention in detail.

FIRST TO THIRD EXAMPLES AND COMPARATIVE EXAMPLE

Figure 2:
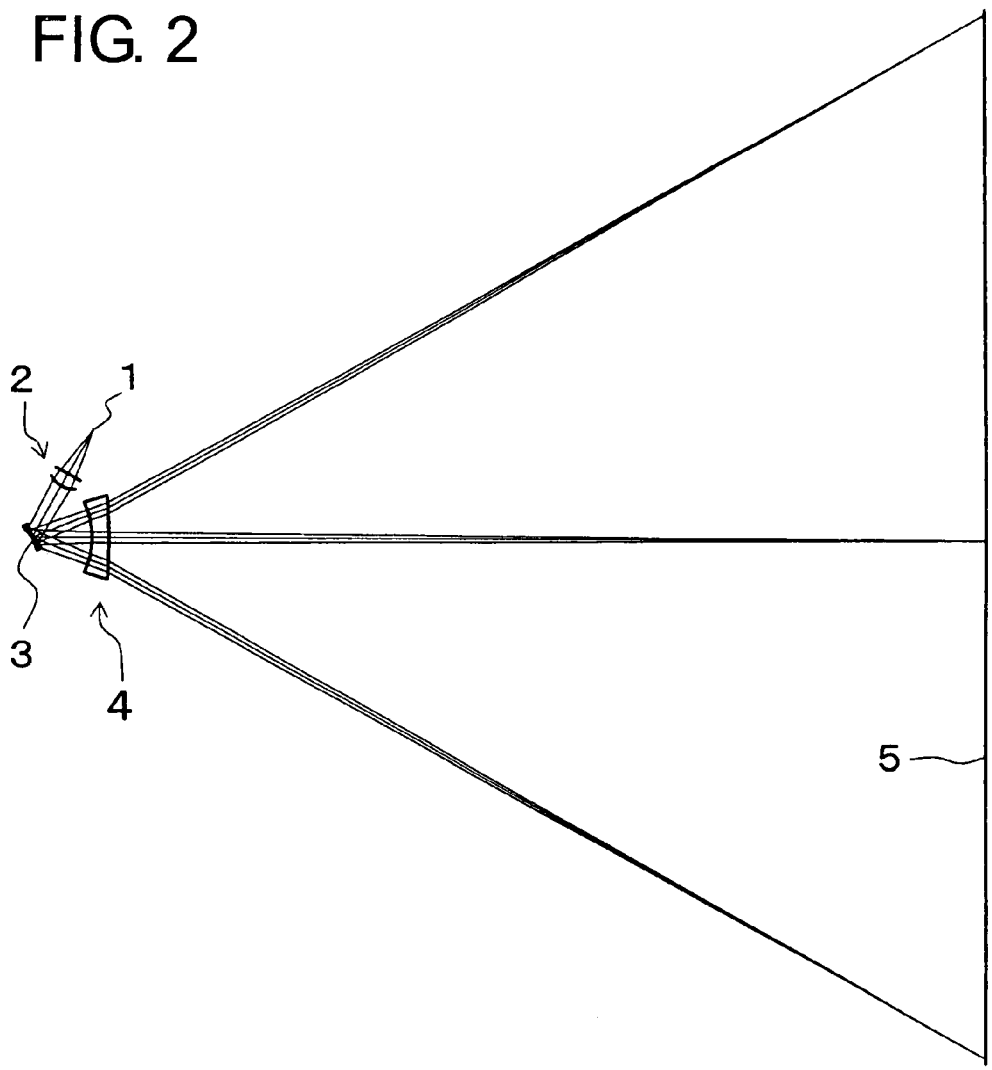
FIG. 2 illustrates a light path in a laser scanning device in accordance with a first example.

FIG. 2 shows light paths in the laser scanning device in accordance with the first example. In FIG. 2, with respect to the condensing lens 2 and the scanning lens 4, only the light incident face and light releasing face are illustrated. Moreover, Table 1 numerically indicates the optical system of the first example based upon coordinates data of the optical faces. These coordinates data express the layouts of the respective optical faces (based upon face apexes) with respect to the origin of a local orthogonal coordinate system (x, y, z) and vectors in a global orthogonal coordinate system (X, Y, Z), and the evaluation face thereof corresponds the surface of the photosensitive member 5.

TABLE 1

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 10.50 | 18.19 | 0.00 | −0.5000 | −0.8660 | 0.0000 | 0.8660 | −0.5000 | 0.0000 |
| 2 | LENS | 8.50 | 14.72 | 0.00 | −0.5000 | −0.8660 | 0.0000 | 0.8660 | −0.5000 | 0.0000 |

TABLE 1-continued

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 3 | RESONANCE MIRROR | 0.00 | 0.00 | 0.00 | −0.8660 | −0.5000 | 0.0000 | 0.5000 | −0.8660 | 0.0000 |
| 4 | SCANNING | 17.36 | 0.00 | 0.00 | 1.0000 | 0.0000 | 0.0000 | 0.0000 | 1.0000 | 0.0000 |
| 5 | LENS | 22.36 | 0.00 | 0.00 | 1.0000 | 0.0000 | 0.0000 | 0.0000 | 1.0000 | 0.0000 |
| 6 | EVALUATION FACE | 278.29 | 0.00 | 0.00 | 1.0000 | 0.0000 | 0.0000 | 0.0000 | 1.0000 | 0.0000 |

In Table 1, face numbers 1 to 6 respectively indicate faces on the light-incident side and the light-releasing side of the condensing lens 2, a light reflective face of the resonance mirror 3, faces on the light-incident side and the light-releasing side of the scanning lens 4, and the surface of the photosensitive member 5. Here, the Z-axis corresponds to an axis in the sub-scanning direction, the Y-axis corresponds to an axis in the main scanning direction, and X-axis is an axis perpendicular to the YZ plane. Moreover, in Table 1, the coordinates of the resonance mirror 3 are indicated based upon the case with a deflection angle of 0 degree.

In the first example, the condensing lens 2 is constituted of one glass positive lens, and the face on the light-releasing side is formed into an axisymmetric non-spherical face. Here, a face on the light-incident side of the condensing lens 2 may be formed into an axisymmetric non-spherical face, or both faces of the condensing lens 2 may be axisymmetric non-spherical faces. The scanning lens 4, which is made of resin, has faces on the light-incident side and light-releasing side that are formed into nonaxisymmetric faces. Here, the refractive index of the glass is 1.530 at an applied wavelength of 405 nm, and the refractive index of the resin is 1.547.

Tables 2 to 4 show face structures (face shapes) of the optical faces. Here, it is defined that $E\text{-}n = \times 10^{-n}$.

TABLE 2

FACE 2: AXISYMMETRIC NON-SPHERICAL FACE

| ORDER | COEFFICIENT |
|---|---|
| 2 | −6.57889E−02 |
| 4 | −8.30808E−05 |
| 6 | −1.85666E−07 |
| 8 | −3.77589E−10 |

TABLE 3

FACE 4: NONAXISYMMETRIC FACE

| | j | |
|---|---|---|
| i | 0 | 2 |
| 0 | 0.00000E+00 | −2.14999E−02 |
| 2 | −2.14999E−02 | −6.85635E−06 |
| 4 | −1.70941E−05 | 2.24226E−07 |
| 6 | 2.34196E−08 | −6.24800E−10 |

TABLE 3-continued

FACE 4: NONAXISYMMETRIC FACE

| | j | |
|---|---|---|
| i | 0 | 2 |
| 8 | −3.63128E−10 | −6.00058E−11 |
| 10 | 3.00845E−12 | 0.00000E+00 |

TABLE 4

FACE 5: NONAXISYMMETRIC FACE

| | j | |
|---|---|---|
| i | 0 | 2 |
| 0 | 0.00000E+00 | −3.63850E−03 |
| 2 | −3.63850E−03 | 1.92983E−05 |
| 4 | −1.45967E−06 | 7.62282E−08 |
| 6 | 1.96101E−08 | −6.94163E−10 |
| 8 | −1.02911E−10 | −2.55498E−12 |
| 10 | 3.66571E−13 | 0.00000E+00 |

The face shape of the nonaxisymmetric face is represented by the following equation 1. Here, $a_{ij}$ is defined as the coefficient of the nonaxisymmetric face.

$$x = \sum_{i=0}^{10} \sum_{j=0}^{6} a_{ij} y^i z^j \quad (1)$$

Moreover, the face shape of axisymmetric non-spherical face is represented by the following equation 2. Here, $a_i$ is defined as a coefficient of the non-spherical face.

$$x = \sum_{i=0}^{10} a_i \left( \sqrt{y^2 + z^2} \right)^i \quad (2)$$

Here, all the coefficients that are not shown in the tables are zero.

In the first example, among the coefficients of the nonaxisymmetric face of the scanning lens 4, $a_{02}$ and $a_{20}$ are equal to each other. The curvature within the main-scanning cross section in the vicinity of the light axis is twice the coefficient $a_{02}$, and the curvature within the sub-scanning cross section in the vicinity of the light axis is twice the coefficient $a_{20}$; therefore, in the first example, with respect to the nonaxisymmetric face of the scanning lens 4, the curvature in the vicinity of the light axis within the main-scanning cross section is equal to the curvature in the vicinity of the light axis within the sub-scanning cross section. Thus, the nonaxisymmetric face in which the curvature within the sub-scanning cross section is changed on the circumferential portion is allowed to devote to the curvature correction of the sub-scanning image face and the groove-shaped aberration correction thereof FIG. 3 shows image-face curvatures within the sub-scanning cross section and within the main-scanning cross section of the optical system of the first example.

Figure 4:
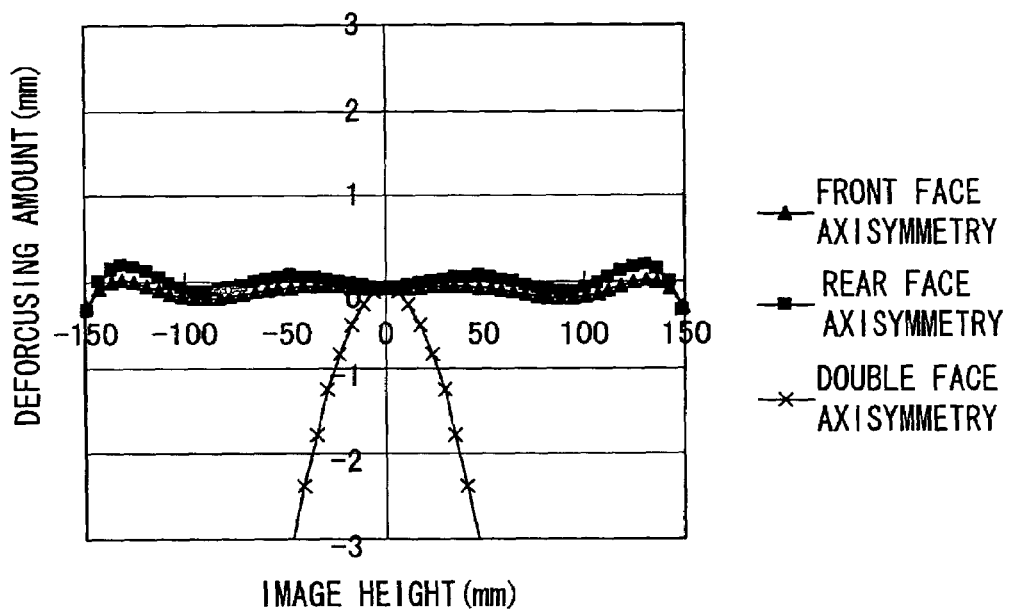
FIG. 4 illustrates image-face curvatures within a sub-scanning cross section in an optical system of each of a second example, a third example and a comparative example.

FIG. 4 shows image-face curvatures within the sub-scanning cross section in the optical systems of each of the second example, third example and comparative example. Here, the second example relates to an optical system in which a front face (face on the light-incident side) of the scanning lens 4 is formed into an axisymmetric non-spherical face and a rear face (face on the light-releasing side) is formed into a nonaxisymmetric face; the third example relates to an optical system in which the rear face of the scanning lens 4 is formed into an axisymmetric non-spherical face and the front face is formed into a nonaxisymmetric face; and the comparative example relates to an optical system in which both faces of the scanning lens 4 are formed into axisymmetric non-spherical faces.

Figure 3:
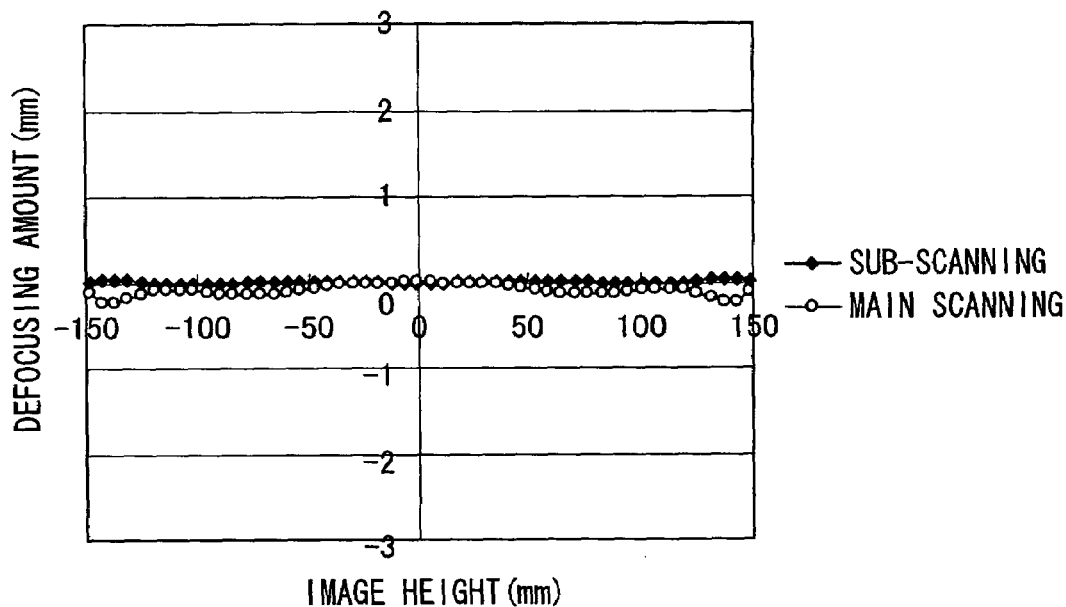
FIG. 3 illustrates image-face curvatures within a sub-scanning cross section and a main-scanning cross section in the optical system of the first example.

Referring to FIGS. 3 and 4, it is found that the first example, which allows the scanning lens 4 to have two nonaxisymmetric faces, has its image-face curvature within the sub-scanning cross section sufficiently corrected so that the highest effect is achieved in comparison with the case of the second example and the third example where the scanning lens 4 has one nonaxisymmetric face. It is also found that the comparative example in which both of the faces of the scanning lens 4 have axisymmetric non-spherical faces so that no nonaxisymmetric face is placed on the scanning lens 4 fails to have its image-face curvature within the sub-scanning cross section corrected.

Table 5 numerically indicates the optical system of the second example based upon coordinates data of the optical faces, and Tables 6 to 8 show face structures (face shapes) of the optical faces of the second example. Moreover, Table 9 numerically indicates the optical system of the third example based upon coordinates data of the optical faces, and Tables 10 to 12 show face structures of the optical faces of the third example. Furthermore, Table 13 numerically indicates the optical system of the comparative example based upon coordinates data of the optical faces, and Tables 14 to 16 show face structures of the optical faces of the comparative example. Here, these Tables are formed based upon the same definitions as those of the first example.

TABLE 5

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 10.50 | 18.19 | 0.00 | −0.5000 | −0.8660 | 0.0000 | 0.8660 | −0.5000 | 0.0000 |
| 2 | LENS | 8.50 | 14.72 | 0.00 | −0.5000 | −0.8660 | 0.0000 | 0.8660 | −0.5000 | 0.0000 |
| 3 | RESONANCE MIRROR | 0.00 | 0.00 | 0.00 | −0.8660 | −0.5000 | 0.0000 | 0.5000 | −0.8660 | 0.0000 |
| 4 | SCANNING | 17.36 | 0.00 | 0.00 | 1.0000 | 0.0000 | 0.0000 | 0.0000 | 1.0000 | 0.0000 |
| 5 | LENS | 22.36 | 0.00 | 0.00 | 1.0000 | 0.0000 | 0.0000 | 0.0000 | 1.0000 | 0.0000 |
| 6 | EVALUATION FACE | 278.29 | 0.00 | 0.00 | 1.0000 | 0.0000 | 0.0000 | 0.0000 | 1.0000 | 0.0000 |

TABLE 6

FACE 2: AXISYMMETRIC NON-SPHERICAL FACE

| ORDER | COEFFICIENT |
|---|---|
| 2 | −6.57889E−02 |
| 4 | −8.30808E−05 |
| 6 | −1.85666E−07 |
| 8 | −3.77589E−10 |

TABLE 7

FACE 4: AXISYMMETRIC NON-SPHERICAL FACE

| ORDER | COEFFICIENT |
|---|---|
| 2 | −2.14999E−02 |
| 4 | −1.70941E−05 |
| 6 | 2.34196E−08 |
| 8 | −3.63128E−10 |
| 10 | 3.00845E−12 |

TABLE 8

FACE 5: NONAXISYMMETRIC FACE

| | j | |
|---|---|---|
| i | 0 | 2 |
| 0 | 0.00000E+00 | −3.63850E−03 |
| 2 | −3.63850E−03 | 2.31603E−06 |
| 4 | −1.45967E−06 | 3.47774E−08 |
| 6 | 1.96101E−08 | 1.55214E−10 |
| 8 | −1.02911E−10 | −2.77860E−12 |
| 10 | 3.66571E−13 | 0.00000E+00 |

TABLE 9

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 10.50 | 18.19 | 0.00 | −0.5000 | −0.8660 | 0.0000 | 0.8660 | −0.5000 | 0.0000 |
| 2 | LENS | 8.50 | 14.72 | 0.00 | −0.5000 | −0.8660 | 0.0000 | 0.8660 | −0.5000 | 0.0000 |
| 3 | RESONANCE MIRROR | 0.00 | 0.00 | 0.00 | −0.8660 | −0.5000 | 0.0000 | 0.5000 | −0.8660 | 0.0000 |
| 4 | SCANNING | 17.36 | 0.00 | 0.00 | 1.0000 | 0.0000 | 0.0000 | 0.0000 | 1.0000 | 0.0000 |
| 5 | LENS | 22.36 | 0.00 | 0.00 | 1.0000 | 0.0000 | 0.0000 | 0.0000 | 1.0000 | 0.0000 |
| 6 | EVALUATION FACE | 278.29 | 0.00 | 0.00 | 1.0000 | 0.0000 | 0.0000 | 0.0000 | 1.0000 | 0.0000 |

TABLE 10

FACE 2: AXISYMMETRIC NON-SPHERICAL FACE

| ORDER | COEFFICIENT |
|---|---|
| 2 | −6.57889E−02 |
| 4 | −8.30808E−05 |
| 6 | −1.85666E−07 |
| 8 | −3.77589E−10 |

TABLE 11

FACE 4: NONAXISYMMETRIC FACE

| | j | |
|---|---|---|
| i | 0 | 2 |
| 0 | 0.00000E+00 | −2.14999E−02 |
| 2 | −2.14999E−02 | −4.31965E−05 |
| 4 | −1.70941E−05 | 1.78914E−07 |
| 6 | 2.34196E−08 | −7.34710E−09 |
| 8 | −3.63128E−10 | 9.36052E−11 |
| 10 | 3.00845E−12 | 0.00000E+00 |

TABLE 12

FACE 5: AXISYMMETRIC NON-SPHERICAL FACE

| ORDER | COEFFICIENT |
|---|---|
| 2 | −3.63850E−03 |
| 4 | −1.45967E−06 |
| 6 | 1.96101E−08 |
| 8 | −1.02911E−10 |
| 10 | 3.66571E−13 |

TABLE 13

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 10.50 | 18.19 | 0.00 | −0.5000 | −0.8660 | 0.0000 | 0.8660 | −0.5000 | 0.0000 |
| 2 | LENS | 8.50 | 14.72 | 0.00 | −0.5000 | −0.8660 | 0.0000 | 0.8660 | −0.5000 | 0.0000 |
| 3 | RESONANCE MIRROR | 0.00 | 0.00 | 0.00 | −0.8660 | −0.5000 | 0.0000 | 0.5000 | −0.8660 | 0.0000 |
| 4 | SCANNING | 17.36 | 0.00 | 0.00 | 1.0000 | 0.0000 | 0.0000 | 0.0000 | 1.0000 | 0.0000 |
| 5 | LENS | 22.36 | 0.00 | 0.00 | 1.0000 | 0.0000 | 0.0000 | 0.0000 | 1.0000 | 0.0000 |
| 6 | EVALUATION FACE | 278.29 | 0.00 | 0.00 | 1.0000 | 0.0000 | 0.0000 | 0.0000 | 1.0000 | 0.0000 |

TABLE 14

FACE 2: AXISYMMETRIC NON-SPHERICAL FACE

| ORDER | COEFFICIENT |
|---|---|
| 2 | −6.57889E−02 |
| 4 | −8.30808E−05 |
| 6 | −1.85666E−07 |
| 8 | −3.77589E−10 |

TABLE 15

FACE 4: AXISYMMETRIC NON-SPHERICAL FACE

| ORDER | COEFFICIENT |
|---|---|
| 2 | −2.14999E−02 |
| 4 | −1.70941E−05 |

TABLE 15-continued

FACE 4: AXISYMMETRIC NON-SPHERICAL FACE

| ORDER | COEFFICIENT |
|---|---|
| 6 | 2.34196E−08 |
| 8 | −3.63128E−10 |
| 10 | 3.00845E−12 |

TABLE 16

FACE 5: AXISYMMETRIC NON-SPHERICAL FACE

| ORDER | COEFFICIENT |
|---|---|
| 2 | −3.63850E−03 |
| 4 | −1.45967E−06 |
| 6 | 1.96101E−08 |
| 8 | −1.02911E−10 |
| 10 | 3.66571E−13 |

Figure 5:
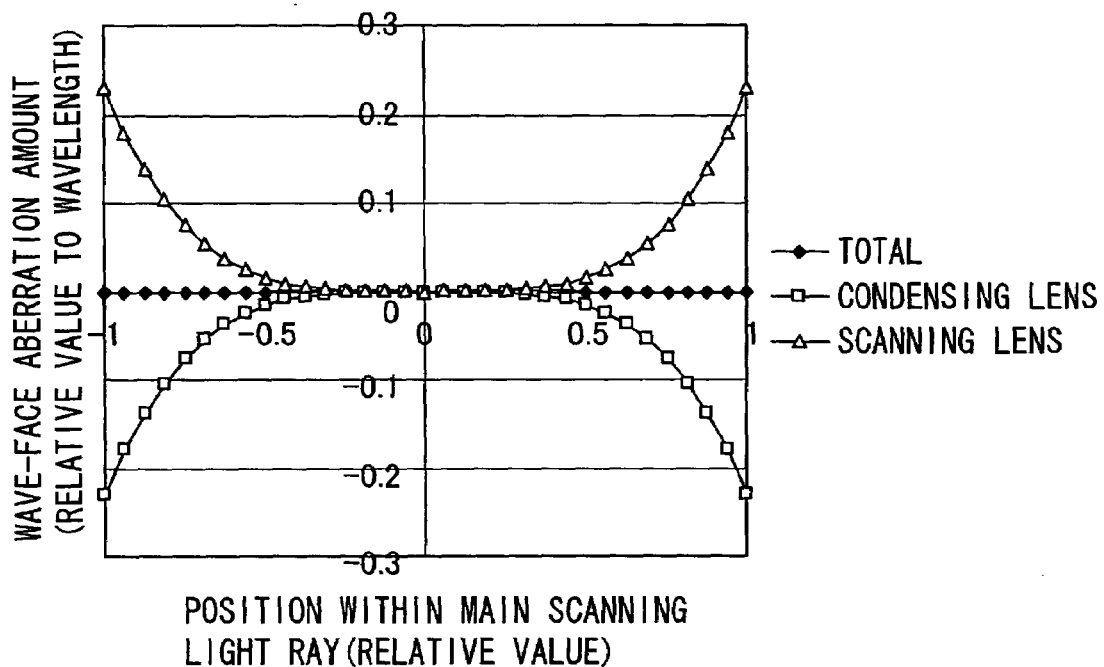
FIG. 5 illustrates spherical aberrations of a condensing lens and a scanning lens within the main-scanning cross section by using wave-face aberrations in the first example.
Figure 6:
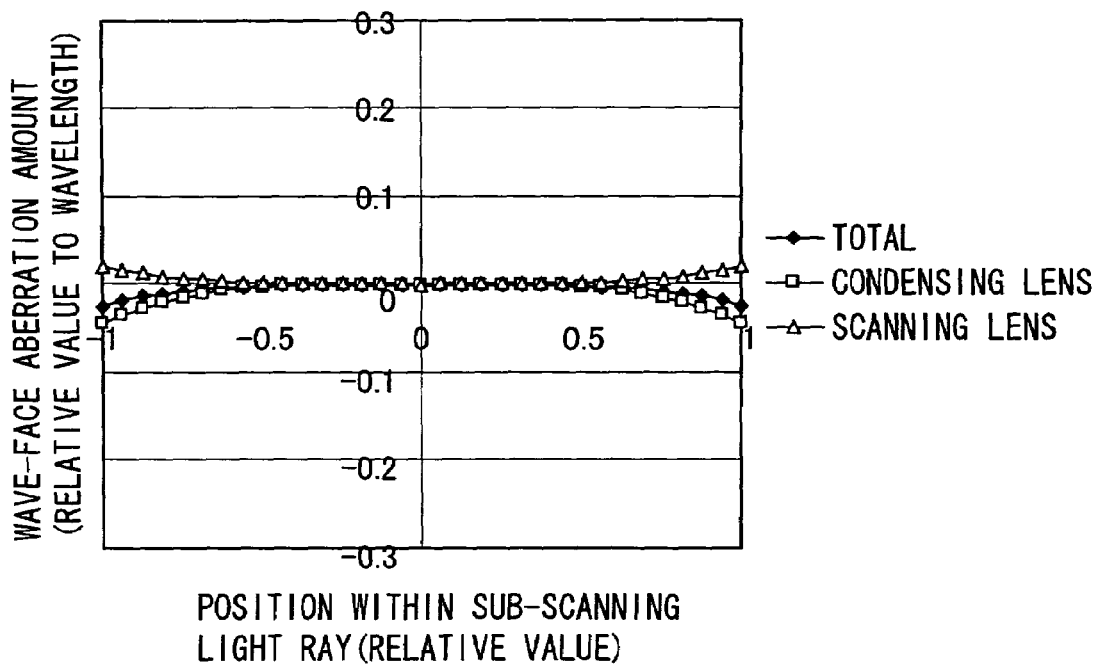
FIG. 6 illustrates spherical aberrations of a condensing lens and a scanning lens within the sub-scanning cross section by using wave-face aberrations in the first example.

Next, FIGS. 5 and 6 indicate spherical aberrations of the condensing lens 2 and the scanning lens 4 by using wave-face aberrations (relative values with respect to the wavelength) in the first example. Here, FIG. 5 shows the wave-face aberrations within the main-scanning cross section, and FIG. 6 shows the wave-face aberrations within the sub-scanning cross section.

With respect to the main-scanning cross section, positive and negative signs are inverted between the spherical aberration of the condensing lens 2 and the spherical aberration of the scanning lens 4, so that correction is made as a whole. This arrangement is derived from the fact that, after the scanning lens 4 has been designed, the condensing lens 2 is designed so as to cancel the spherical aberration within the main-scanning cross section caused by the scanning lens 4. In the case where the condensing lens 2 as a single unit is designed so as not to generate spherical aberration, defocusing derived from spherical aberration is generated.

Here, since the condensing lens 2 has an axisymmetric shape, the spherical aberration within the sub-scanning cross section is not corrected even though the spherical aberration within the main-scanning cross section is corrected. However, the width of light rays is narrowed on the sub-scanning cross section, so that the amount of generation of the spherical aberration is made smaller within the sub-scanning cross section in comparison with that within the main-scanning cross section.

Figure 7:
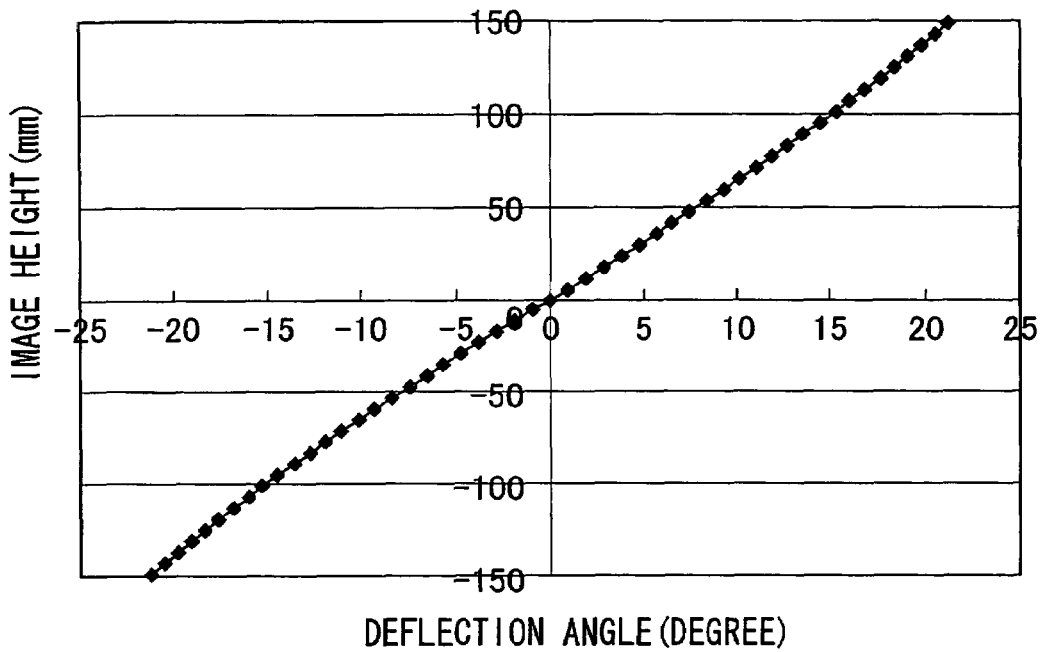
FIG. 7 illustrates the results of calculations carried out on an image height with respect to a deflection angle in the first example.

FIG. 7 shows the results of calculations carried out on the image height with respect to the deflection angle. In FIG. 7, the graph line deviates from the straight line, indicating that the image height changes greatly even with a small change in the deflection angle and that this tendency becomes greater toward the image peripheral portion. This arrangement is made because, when a resonator 3 that allows the light reflective face to sine-wave rock is used as the deflector, the laser light, deflected by the resonator 3, is allowed to carry out a scanning process at a constant speed on the photosensitive member 5. In the first example, the scanning lens 4 is aberration-corrected so as to achieve such a scanning process at a constant speed.

Figure 8:
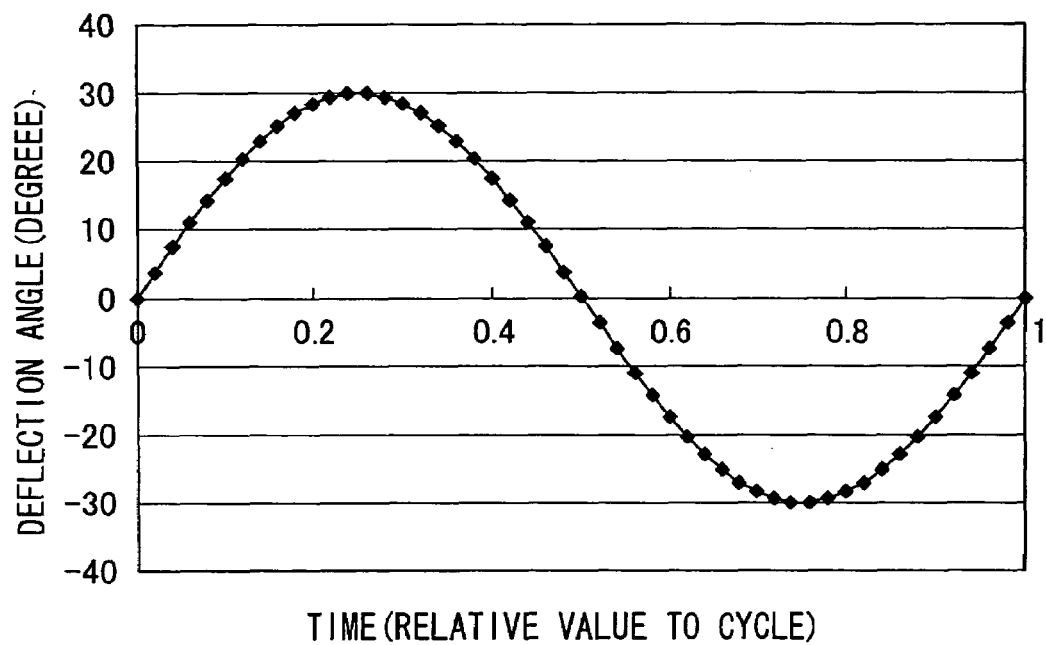
FIG. 8 illustrates a change in deflection angle with respect to time in each of the examples of the present invention.
Figure 9:
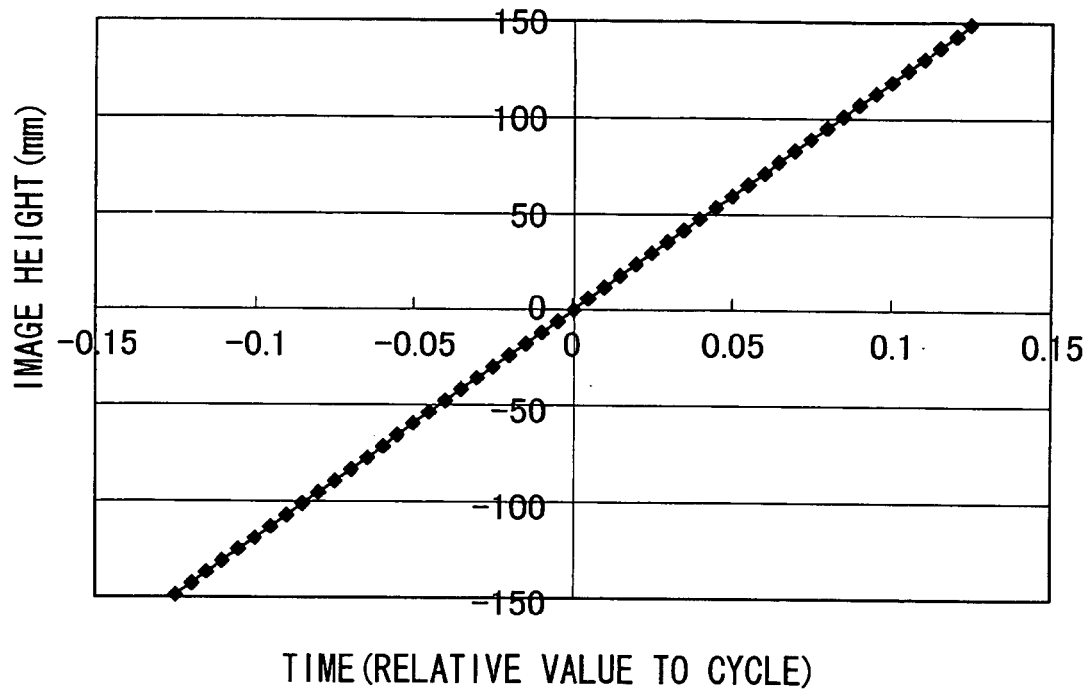
FIG. 9 illustrates a change in image height with respect to time in the first example.

FIG. 8 shows a change in deflection angle for the time in each of the examples of the present invention. The maximum deflection angle in the resonator 3 is 30 degrees; however, the deflection angles within a range of ±21.2 degrees are used for drawing images. FIG. 9 shows a change in image height for the time in the first example. In FIG. 9, the graph line forms a straight line, indicating that a scanning process at a constant speed is almost carried out on the photosensitive member 5 as described above.

Figure 10:
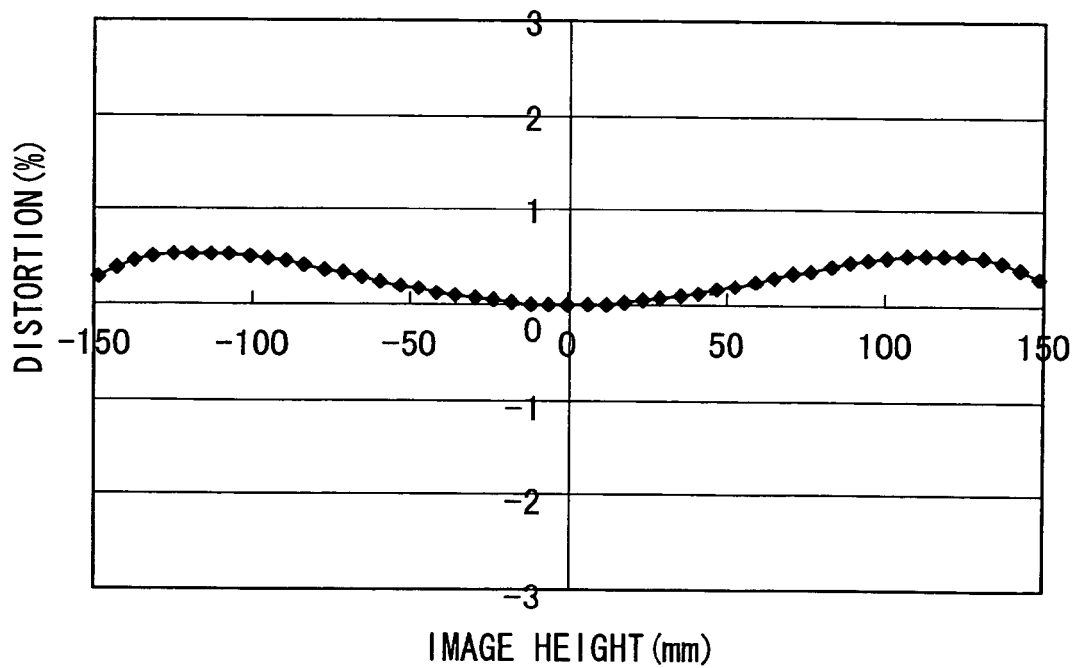
FIG. 10 illustrates a distortion in the first example.

FIG. 10 shows distortion in the first example. In this case, an optimal image height is represented by the following equation 3.

$$k \arcsin \frac{\theta}{\omega_{max}} \quad (3)$$

(where
k: optimal image-height calculation coefficient
θ: deflection angle
ωmax: maximum deflection angle including a range not to be used for drawing images.)

In the first example, ωmax was set to 30 degrees as described above, and k was about 188 as a result of calculations carried out based upon the image-height change when the deflection angle is slightly changed in the vicinity of the deflection angle of 0 degree.

Here, when the incident light onto the deflector is given as parallel light rays, k is a value obtained by multiplying the focal distance within the main-scanning cross section of the scanning optical system by a numeric value corresponding to ωmax represented by radian. Moreover, the focal distance of the main-scanning cross section of the scanning optical system in which the incident light onto the deflector is given as parallel light rays, with the value of k being set to the same value as that of the first example, is given as about 360 mm. In this case, when the scanning optical system is formed by using a single lens, the distance from the deflector to the photosensitive member is set to a value greater than 360 mm, since it is difficult to shift the position of the main point greatly from the position of the scanning lens.

In contrast, in the first example, since light to be made incident on the resonance mirror 3 serving as the deflector is given not as parallel light rays, but as converging light rays, the distance b from the resonance mirror 3 to the photosensitive member 5 is shortened to about 278 mm. In the first example, the distance a from the incident position onto the resonance mirror 3 to a position at which light rays deflected by the resonance mirror 3 are converged, if no scanning lens 4 is placed, is about 60 mm. The greater the value of (b/a), that is, the smaller the value of a, the greater the angle expansion ratio; thus, it becomes possible to shorten the entire length.

Figure 11:
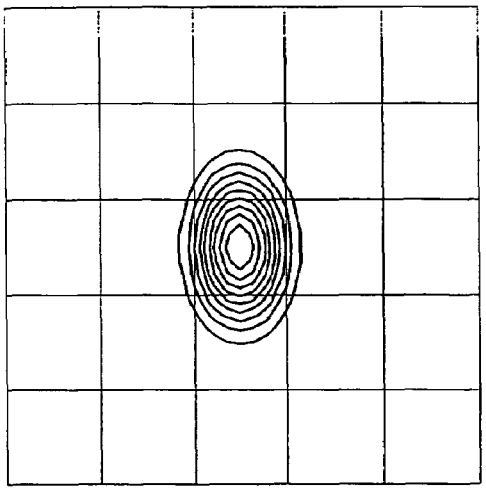
FIG. 11 illustrates a beam shape in the center of an image at a certain moment in the first example.
Figure 12:
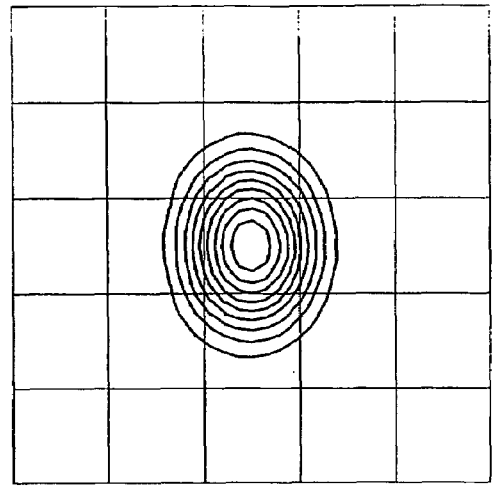
FIG. 12 illustrates a beam shape at an image end portion at a certain moment in the first example.
Figure 13:
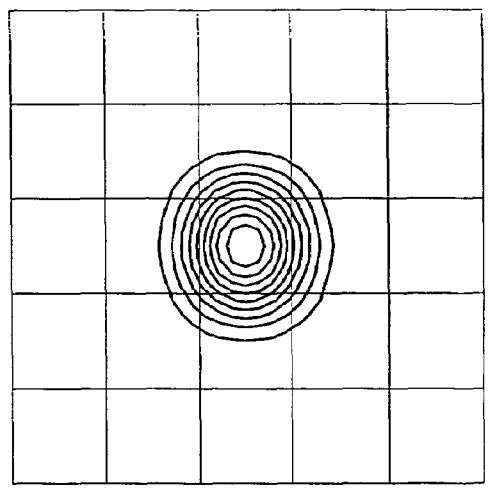
FIG. 13 illustrates a beam shape obtained when the center of an image is scanned for a period of time corresponding to one dot in the first example.
Figure 14:
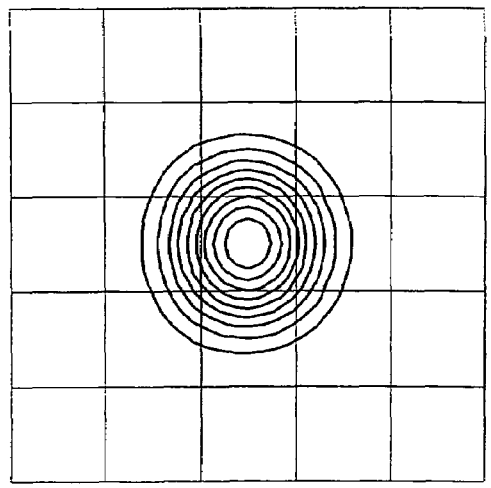
FIG. 14 illustrates a beam shape obtained when the image end portion is scanned for a period of time corresponding to one dot in the first example.

FIGS. 11 to 14 show beam shapes in the first example. In these figures, contour lines are drawn with 10% scales with respect to each of peak intensities. FIGS. 11 and 12 show beam shapes at a certain moment, and FIGS. 13 and 14 show beam shapes (results of light energy accumulation) obtained after a scanning process by a period of time corresponding to one dot. Here, FIGS. 11 and 13 show beam shapes in the center of an image, and FIGS. 12 and 14 show beam shapes at an end portion of the image.

Figure 15:
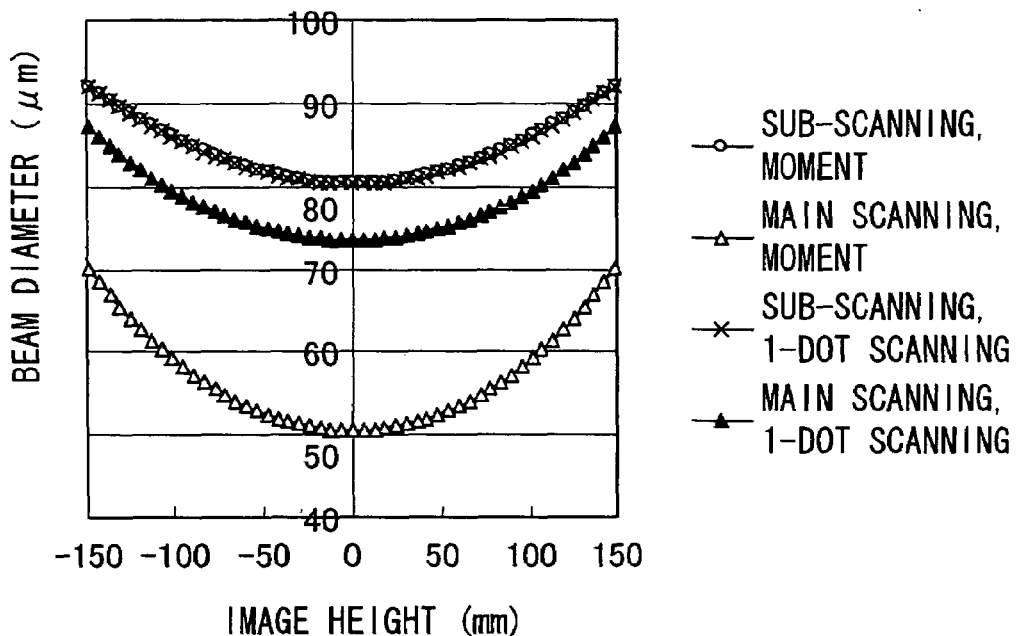
FIG. 15 illustrates a beam diameter in the case of a light intensity of 13.5% of the peak level in the first example.

In this manner, when a beam shape at a certain moment is viewed, the beam has a longitudinally elongated shape. Although the difference in beam diameter is large depending on positions on an image, the beam shape obtained after a scanning process for one dot is almost round, with the difference in beam diameter depending on positions on an image being reduced in comparison with that observed in the moment. FIG. 15 shows the beam diameter when viewed with a light intensity of 13.5% of the peak level.

The reason that the difference in beam diameter at a certain moment becomes greater depending on positions on an image is because the effective F number varies depending on positions on an image and particularly because the effective F number varies greatly within the main-scanning cross section. The effective F number within the main-scanning cross section is dependent on the image-projection characteristic of the scanning optical system and the incident angle onto the photosensitive member 5.

Here, when the image-projection characteristic of the scanning optical system provides a relationship in which the change in image height is in proportion to the change in deflection angle, the beam diameter in the main scanning direction viewed within the plane of the photosensitive member 5 becomes constant irrespective of the positions on an image. This relationship in which the change in image height is in proportion to the change in deflection angle is utilized in a scanning optical system using a polygon mirror, and referred to as fθ characteristic since the proportional constant becomes equal to the focal distance within the main-scanning cross section of the scanning optical system in the case when the incident light onto the polygon mirror forms parallel light rays within the main-scanning cross section.

In contrast, in the first example, the image-projection characteristic deviates from the proportional relationship and forms an image-projection characteristic represented by the above-mentioned optimal image-height equation (equation 3), with the result that the beam diameter within the main-scanning cross section does not become constant, and is indicated by a value that satisfies the following equation 4, if there is no aberration.

$$\frac{d_0}{\sqrt{1-\left(\frac{\theta}{\omega_{max}}\right)^2}} \quad (4)$$

(where $d_0$: beam diameter in main-scanning cross section at 0 degree in deflection angle $\theta$: deflection angle $\omega_{max}$: maximum deflection angle including a range not to be used for drawing images.)

Here, when $\theta=0$, the denominator is 1, and as the absolute value of $\theta$ becomes greater, the denominator becomes smaller so that the beam diameter in the main-scanning cross section at the time of no aberration is minimized at 0 degree in deflection angle, and monotonically increases toward the end portion. In this case, the absolute value of $\theta$ never exceeds $\omega_{max}$ so that the denominator never becomes zero.

Figure 16:
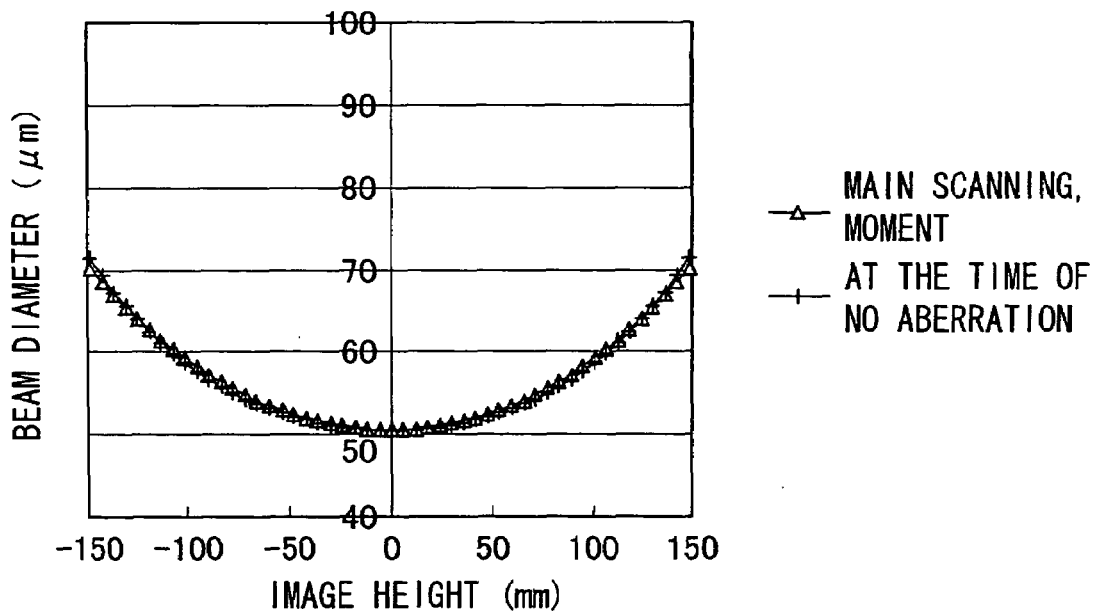
FIG. 16 illustrates a beam diameter in the case of no aberration in the first example.

FIG. 16 shows a case where, in the first example, the equation (equation 4) of the beam diameter at the time of no aberration is substituted by a beam diameter at a light intensity of 13.5% of the beam shown in FIG. 11 as $d_0$. For comparison, the beam diameter in the main scanning direction shown in FIG. 15 is also shown in FIG. 16 in combination, and these graphs are almost coincident with each other.

Figure 17:
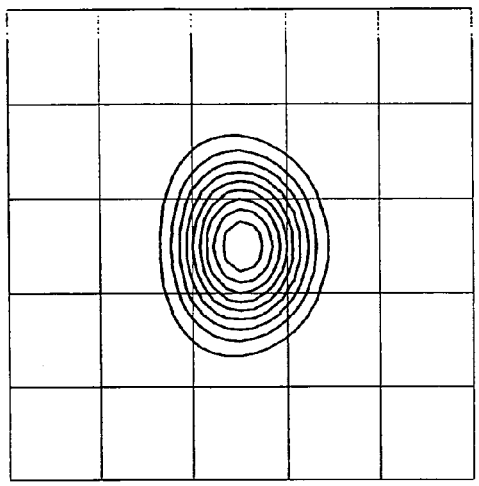
FIG. 17 illustrates a beam shape at an image end portion at a certain moment in the second example.
Figure 18:
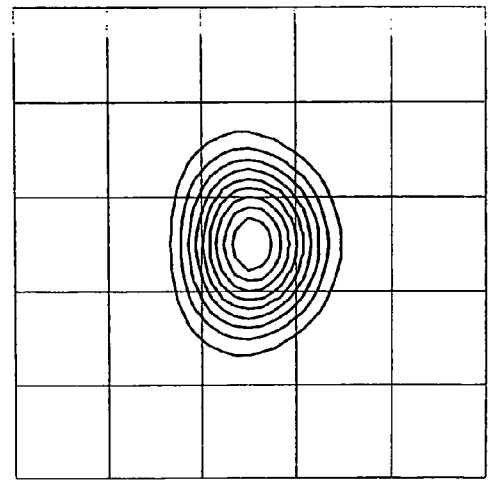
FIG. 18 illustrates a beam shape at an image end portion at a certain moment in the third example.

FIGS. 17 and 18 show beam shapes at a certain moment at an image end portion in the second and the third examples in which one face of the scanning lens 4 is formed into an axisymmetric non-spherical face. FIG. 17 shows a case in which the front face of the scanning lens 4 is an axisymmetric non-spherical face (second example), and FIG. 18 shows a case where the rear face of the scanning lens 4 is an axisymmetric non-spherical face (third example).

In FIG. 11, the beam shape has an almost elliptical shape; however, in FIGS. 17 and 18, the beam shape is slightly deformed into a triangular shape. This is because the groove-shaped aberration correcting operation is not available. Therefore, in order to provide the groove-shaped aberration correcting operation, it is effective to use two nonaxisymmetric faces in the scanning lens 4. When FIG. 17 is compared with FIG. 18, the deformed state is slightly smaller in FIG. 17.

Based upon the results of the first to third examples and comparative example, it is found that in order to carry out the image-face curvature correction and the groove-shaped aberration correction within the sub-scanning cross section, the scanning lens 4 preferably has at least one nonaxisymmetric face, which provides the same powers in the vicinity of the light axis in the two directions, that is, the main scanning direction and the sub-scanning direction and, more preferably two nonaxisymmetric faces.

Moreover, based upon the results of FIG. 17 and FIG. 18, the second example is more preferable than the third example in order to carry out the groove-shaped aberration correction; therefore, the scanning lens 4 is more preferably arranged so that the face on the light-incident side (face on the resonance mirror 3 side) is formed into an axisymmetric non-spherical face and the face on the light-releasing side is formed into a nonaxisymmetric face.

FOURTH EXAMPLE

Different from the first example, an optical system in accordance with the fourth example is designed so that the condensing lens 2 has a nonaxisymmetric face. Here, the scanning lens 4 is the same as that of the first example. Moreover, the shape in the main-scanning cross section of the condensing lens 2 is the same as that of the first example.

Table 17 numerically indicates the optical system of the fourth example based upon coordinates data of the optical faces, and Tables 18 to 20 show face structures (face shapes) of the optical faces of the fourth example. Here, these tables are provided based upon completely the same definitions as those of the first example.

TABLE 17

| | | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| FACE | NAME | X | Y | Z | X | Y | Z | X | Y | Z |
| 1 | CONDENSING | 10.50 | 18.19 | 0.00 | −0.5000 | −0.8660 | 0.0000 | 0.8660 | −0.5000 | 0.0000 |
| 2 | LENS | 8.50 | 14.72 | 0.00 | −0.5000 | −0.8660 | 0.0000 | 0.8660 | −0.5000 | 0.0000 |
| 3 | RESONANCE MIRROR | 0.00 | 0.00 | 0.00 | −0.8660 | −0.5000 | 0.0000 | 0.5000 | −0.8660 | 0.0000 |

TABLE 17-continued

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 4 | SCANNING | 17.36 | 0.00 | 0.00 | 1.0000 | 0.0000 | 0.0000 | 0.0000 | 1.0000 | 0.0000 |
| 5 | LENS | 22.36 | 0.00 | 0.00 | 1.0000 | 0.0000 | 0.0000 | 0.0000 | 1.0000 | 0.0000 |
| 6 | EVALUATION FACE | 278.29 | 0.00 | 0.00 | 1.0000 | 0.0000 | 0.0000 | 0.0000 | 1.0000 | 0.0000 |

TABLE 18

FACE 2: NONAXISYMMETRIC FACE

| | | j | |
|---|---|---|---|
| i | 0 | 2 | 4 |
| 0 | 0.00000E+00 | −6.57870E−02 | −8.27970E−05 |
| 2 | −6.57889E−02 | −1.67284E−04 | 0.00000E+00 |
| 4 | −8.30808E−05 | −3.96899E−07 | 0.00000E+00 |
| 6 | −1.85666E−07 | 0.00000E+00 | 0.00000E+00 |
| 8 | −3.77589E−10 | 0.00000E+00 | 0.00000E+00 |

TABLE 19

FACE 4: NONAXISYMMETRIC FACE

| | | j |
|---|---|---|
| i | 0 | 2 |
| 0 | 0.00000E+00 | −2.14999E−02 |
| 2 | −2.14999E−02 | −6.85635E−06 |
| 4 | −1.70941E−05 | 2.24226E−07 |
| 6 | 2.34196E−08 | −6.24800E−10 |
| 8 | −3.63128E−10 | −6.00058E−11 |
| 10 | 3.00845E−12 | 0.00000E+00 |

TABLE 20

FACE 5: NONAXISYMMETRIC FACE

| | | j |
|---|---|---|
| i | 0 | 2 |
| 0 | 0.00000E+00 | −3.63850E−03 |
| 2 | −3.63850E−03 | 1.92983E−05 |
| 4 | −1.45967E−06 | 7.62282E−08 |
| 6 | 1.96101E−08 | −6.94163E−10 |
| 8 | −1.02911E−10 | −2.55498E−12 |
| 10 | 3.66571E−13 | 0.00000E+00 |

Figure 19:
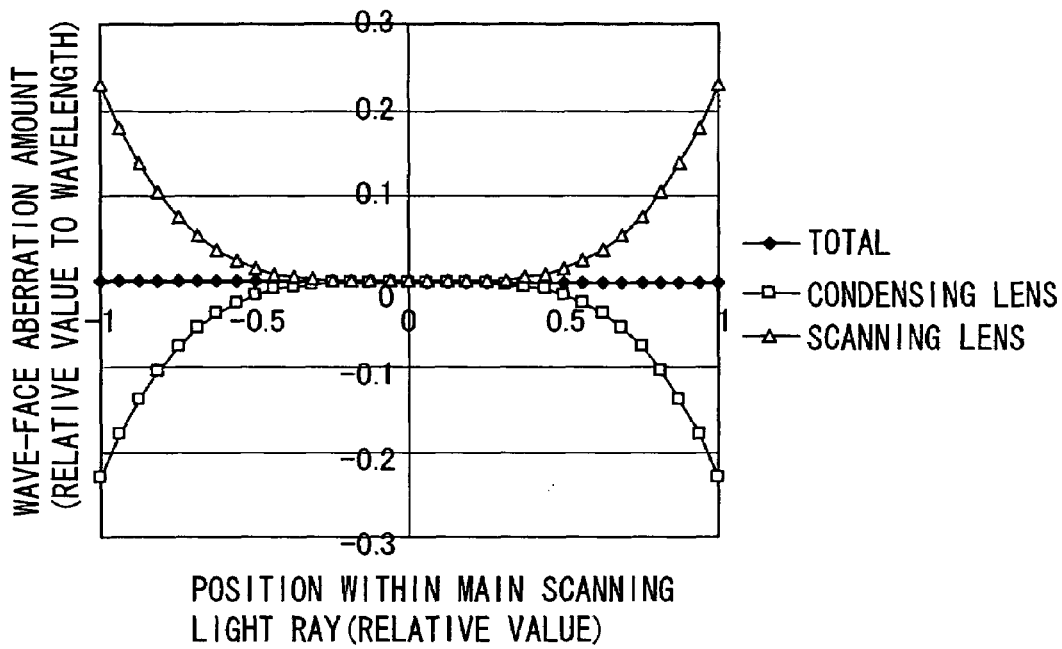
FIG. 19 illustrates spherical aberrations of a condensing lens and a scanning lens within the main-scanning cross section by using wave-face aberrations in a fourth example.
Figure 20:
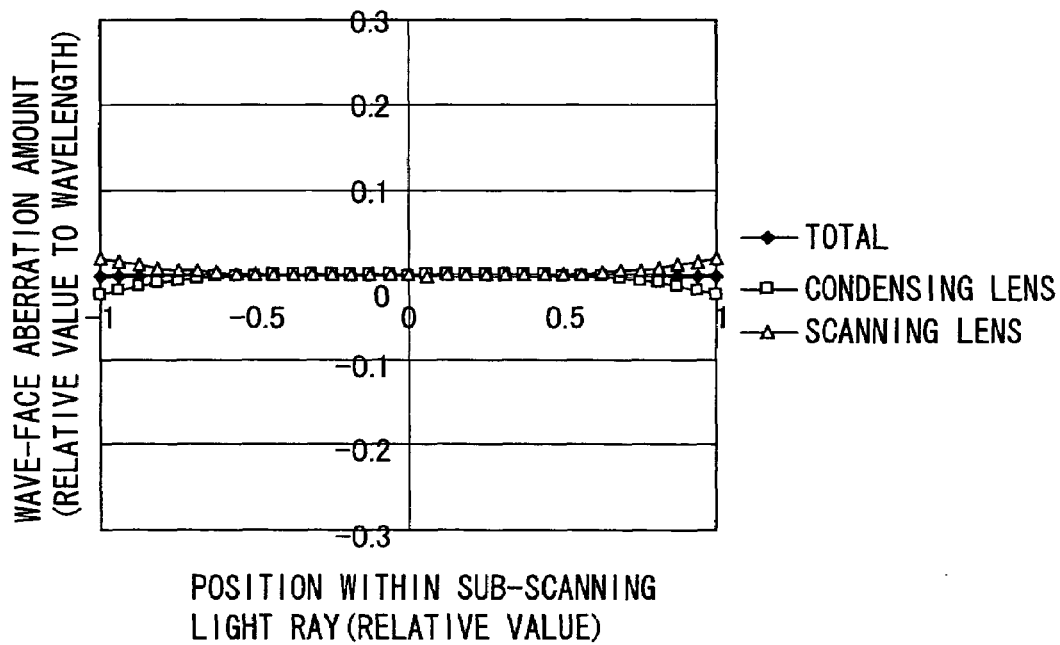
FIG. 20 illustrates spherical aberrations of a condensing lens and a scanning lens within the sub-scanning cross section by using wave-face aberrations in the fourth example.

Next, FIGS. 19 and 20 indicate spherical aberrations of the condensing lens 2 and the scanning lens 4 by using wave-face aberrations (relative values with respect to the wavelength). Here, FIG. 19 shows the wave-face aberrations within the main-scanning cross section, and FIG. 20 shows the wave-face aberrations within the sub-scanning cross section. The effect of allowing the condensing lens 2 to have a nonaxisymmetric face also makes it possible to correct the spherical aberration with respect to the sub-scanning cross section as a whole.

Here, in the fourth example, the face on the light-releasing side of the condensing lens 2 has the nonaxisymmetric face; however, the face on the light-incident side may have a nonaxisymmetric face, and both of the faces may have nonaxisymmetric faces.

FIFTH EXAMPLE

Figure 21:
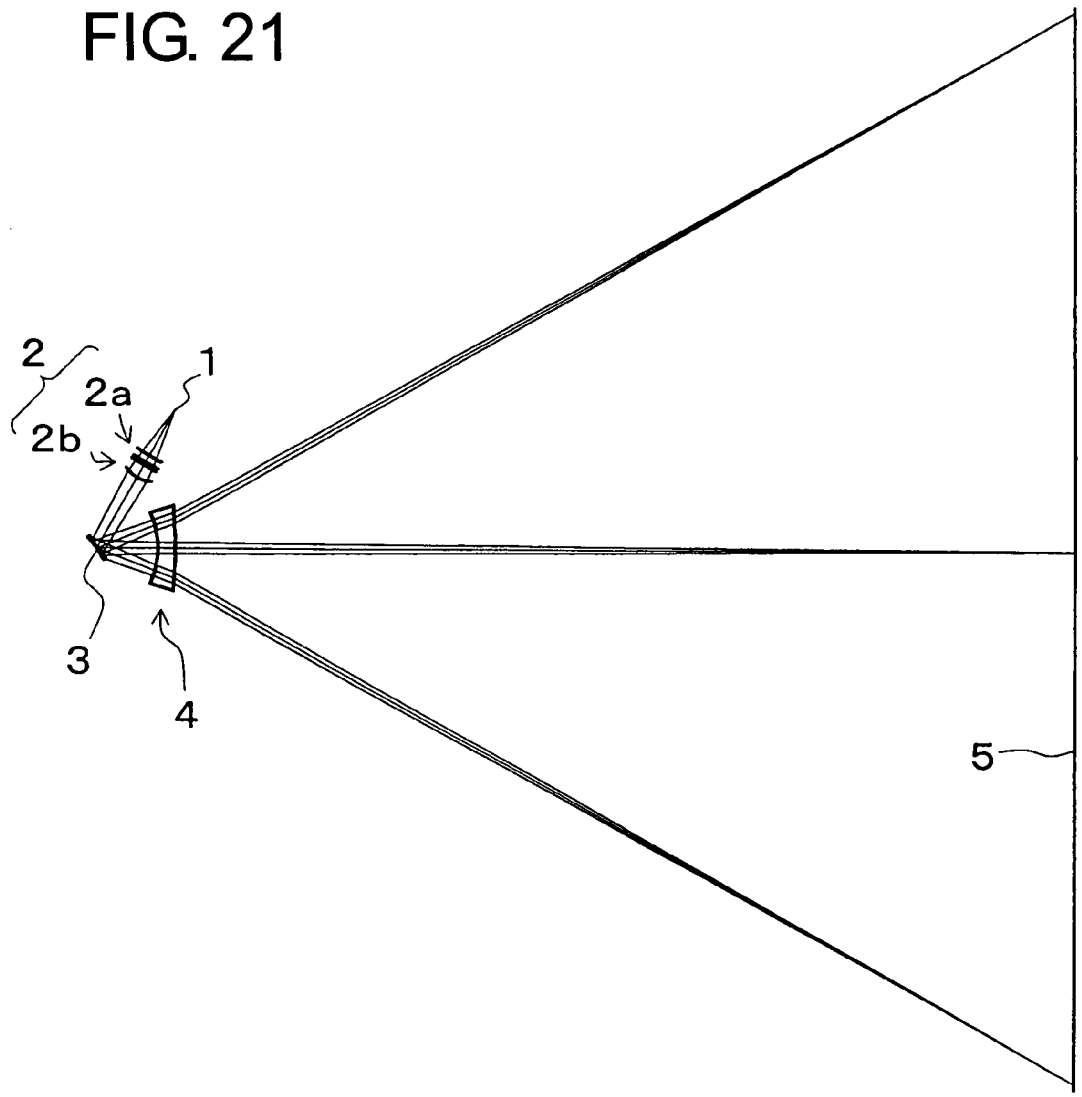
FIG. 21 illustrates a light path in a laser scanning device in accordance with a fifth example.

FIG. 21 shows light paths of a laser scanning device in accordance with a fifth example of the present invention. In the fifth example, the condensing lens 2 is constituted of two lenses, that is, a resin negative lens 2a and a glass positive lens 2b. The resin negative lens 2a is placed closer to the laser light-source 1 side than the glass positive lens 2b. The resin negative lens 2a is an axisymmetric non-spherical lens with at least one face (a face on the light-incident side in this example) being formed into an axisymmetric non-spherical face. The glass positive lens 2b is a spherical lens with at least one face (a face on the light-releasing side in this example) being formed into a spherical face. Here, the rest of the faces of the glass positive lens 2b may be a plane. Here, the scanning lens 4 has the same structure as that of the first example.

Table 21 numerically indicates the optical system of the fifth example, and Tables 22 to 25 show face structures (face shapes) of the optical faces of the fifth example. Here, face numbers 1 to 8 in Table 21 respectively indicate faces on the light-incident side and the light-releasing side of the resin negative lens 2a of the condensing lens 2, faces on the light-incident side and the light-releasing side of the glass positive lens 2b, a light reflective face of the resonance mirror 3, faces on the light-incident side and the light-releasing side of the scanning lens 4, and a surface of the photosensitive member 5. With respect to the other portions, these tables are provided based upon the same definitions as those of the first example.

TABLE 21

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 15.00 | 25.98 | 0.00 | −0.5000 | −0.8660 | 0.0000 | 0.8660 | −0.5000 | 0.0000 |
| 2 | LENS (RESIN) | 14.00 | 24.25 | 0.00 | −0.5000 | −0.8660 | 0.0000 | 0.8660 | −0.5000 | 0.0000 |

TABLE 21-continued

| | | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| FACE | NAME | X | Y | Z | X | Y | Z | X | Y | Z |
| 3 | CONDENSING | 13.50 | 23.38 | 0.00 | −0.5000 | −0.8660 | 0.0000 | 0.8660 | −0.5000 | 0.0000 |
| 4 | LENS (GLASS) | 11.50 | 19.92 | 0.00 | −0.5000 | −0.8660 | 0.0000 | 0.8660 | −0.5000 | 0.0000 |
| 5 | RESONANCE MIRROR | 0.00 | 0.00 | 0.00 | −0.8660 | −0.5000 | 0.0000 | 0.5000 | −0.8660 | 0.0000 |
| 6 | SCANNING | 17.36 | 0.00 | 0.00 | 1.0000 | 0.0000 | 0.0000 | 0.0000 | 1.0000 | 0.0000 |
| 7 | LENS | 22.36 | 0.00 | 0.00 | 1.0000 | 0.0000 | 0.0000 | 0.0000 | 1.0000 | 0.0000 |
| 8 | EVALUATION FACE | 278.29 | 0.00 | 0.00 | 1.0000 | 0.0000 | 0.0000 | 0.0000 | 1.0000 | 0.0000 |

TABLE 22

FACE 1: AXISYMMETRIC NON-SPHERICAL FACE

| ORDER | COEFFICIENT |
|---|---|
| 2 | −2.02584E−03 |
| 4 | −4.63784E−04 |
| 6 | −2.82850E−06 |
| 8 | −2.44706E−08 |

TABLE 23

FACE 4: SPHERICAL FACE

| CURVATURE |
|---|
| −1.19828E−01 |

TABLE 24

FACE 6: NONAXISYMMETRIC FACE

| | j | |
|---|---|---|
| i | 0 | 2 |
| 0 | 0.00000E+00 | −2.14999E−02 |
| 2 | −2.14999E−02 | −6.85635E−06 |
| 4 | −1.70941E−05 | 2.24226E−07 |
| 6 | 2.34196E−08 | −6.24800E−10 |
| 8 | −3.63128E−10 | −6.00058E−11 |
| 10 | 3.00845E−12 | 0.00000E+00 |

TABLE 25

FACE 7: NONAXISYMMETRIC FACE

| | j | |
|---|---|---|
| i | 0 | 2 |
| 0 | 0.00000E+00 | −3.63850E−03 |
| 2 | −3.63850E−03 | 1.92983E−05 |
| 4 | −1.45967E−06 | 7.62282E−08 |
| 6 | 1.96101E−08 | −6.94163E−10 |
| 8 | −1.02911E−10 | −2.55498E−12 |
| 10 | 3.66571E−13 | 0.00000E+00 |

The condensing lens 2 is constituted of the resin negative lens 2a and the glass positive lens 2b, so that it becomes possible to suppress defocusing at the time of a temperature change. In the first example, defocusing of about 1.5 mm per temperature change of 10 degrees occurs on both of the main-scanning cross section and the sub-scanning cross section; however, in the fifth example, based upon calculations in the vicinity of the main light ray, defocusing per temperature change of 10 degrees becomes about 0.0 mm on both of the main-scanning cross section and the sub-scanning cross section. However, when a change in spherical aberration due to a temperature change is taken into consideration and calculations are carried out on the entire light rays, defocusing of about 1.1 mm and defocusing of about 0.8 mm occur on the main-scanning cross section and on the sub-scanning cross section, respectively. Additionally, in the first example, the defocusing per temperature change of 10 degrees is about 1.5 mm in both of the calculations in the vicinity of the main light ray and in the entire light rays.

Moreover, by preparing the glass positive lens 2b as a spherical lens, it is possible to reduce costs in comparison with the case where a non-spherical lens is used; however, this structure causes greater spherical aberration. Here, since at least one face of the resin positive lens 2a is formed into an axisymmetric non-spherical face, the spherical aberration caused by the condensing lens 2 can be corrected.

SIXTH EXAMPLE

Figure 22:
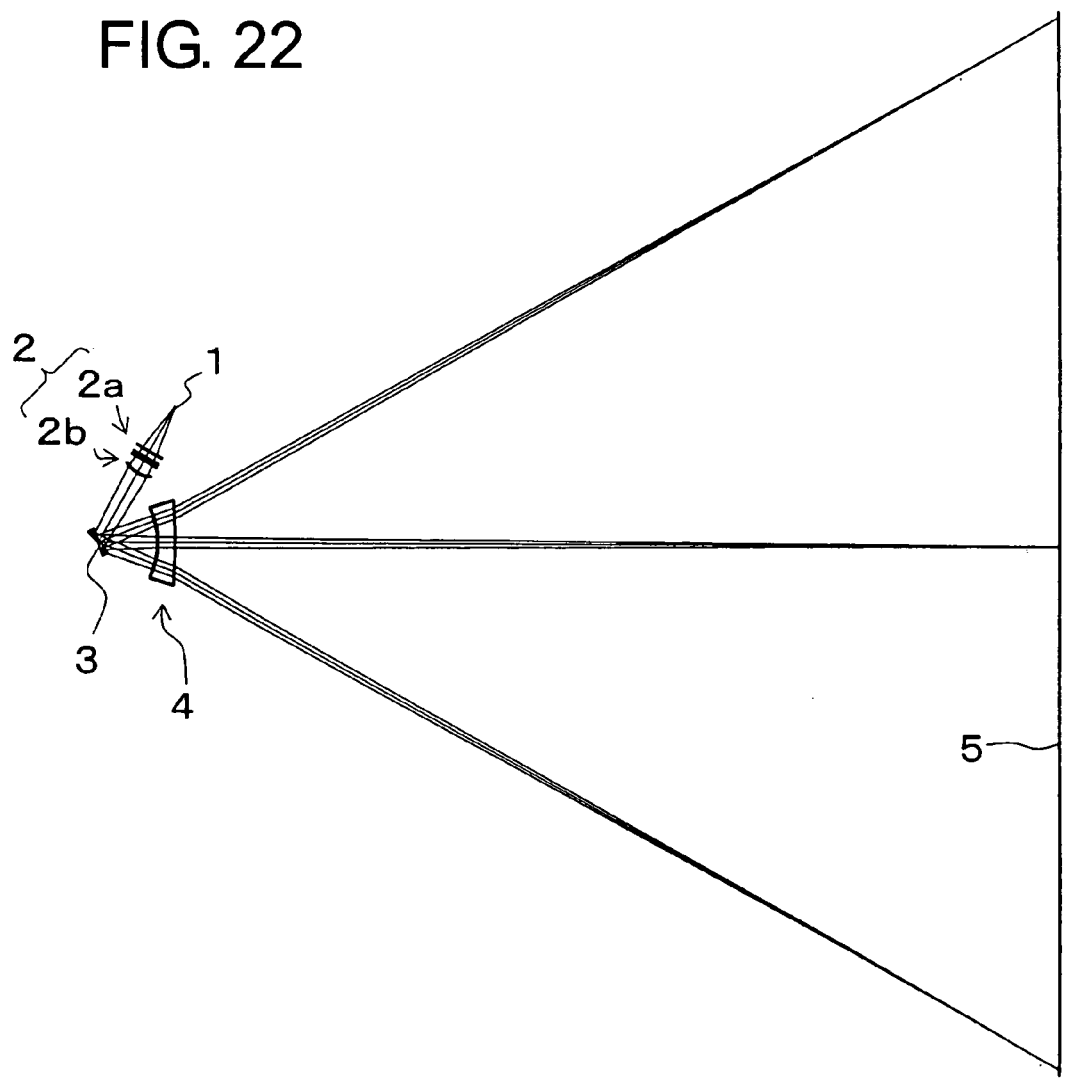
FIG. 22 illustrates a light path in a laser scanning device in accordance with a sixth example.

FIG. 22 shows light paths of a laser scanning device in accordance with a sixth example of the present invention. In the sixth example, the condensing lens 2 is constituted of two lenses, that is, a resin negative lens 2a and a glass positive lens 2b. The resin negative lens 2a is placed closer to the laser light-source 1 side than the glass positive lens 2b.

The sixth example is the same as the fifth example in that at least one face (a face on the light-incident side in this example) of the resin negative lens 2a is formed into an axisymmetric non-spherical face; however, it is different from the fifth example in that at least one face (a face on the light-releasing side in this example) of the glass positive lens 2b is formed into an axisymmetric non-spherical face. Here, the scanning lens 4 has the same structure as that of the first example.

Table 26 numerically indicates the optical system of the sixth example, and Tables 27 to 30 show face structures (face shapes) of the optical faces of the sixth example. Here, these tables are provided based upon the same definitions as those of the fifth example.

TABLE 26

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 15.00 | 25.98 | 0.00 | −0.5000 | −0.8660 | 0.0000 | 0.8660 | −0.5000 | 0.0000 |
| 2 | LENS (RESIN) | 14.00 | 24.25 | 0.00 | −0.5000 | −0.8660 | 0.0000 | 0.8660 | −0.5000 | 0.0000 |
| 3 | CONDENSING | 13.50 | 23.38 | 0.00 | −0.5000 | −0.8660 | 0.0000 | 0.8660 | −0.5000 | 0.0000 |
| 4 | LENS (GLASS) | 11.50 | 19.92 | 0.00 | −0.5000 | −0.8660 | 0.0000 | 0.8660 | −0.5000 | 0.0000 |
| 5 | RESONANCE MIRROR | 0.00 | 0.00 | 0.00 | −0.8660 | −0.5000 | 0.0000 | 0.5000 | −0.8660 | 0.0000 |
| 6 | SCANNING | 17.36 | 0.00 | 0.00 | 1.0000 | 0.0000 | 0.0000 | 0.0000 | 1.0000 | 0.0000 |
| 7 | LENS | 22.36 | 0.00 | 0.00 | 1.0000 | 0.0000 | 0.0000 | 0.0000 | 1.0000 | 0.0000 |
| 8 | EVALUATION FACE | 278.29 | 0.00 | 0.00 | 1.0000 | 0.0000 | 0.0000 | 0.0000 | 1.0000 | 0.0000 |

TABLE 27

FACE 1: AXISYMMETRIC NON-SPHERICAL FACE

| ORDER | COEFFICIENT |
|---|---|
| 2 | −1.95163E−03 |
| 4 | −6.87357E−05 |
| 6 | 5.62099E−06 |
| 8 | −1.43094E−07 |

TABLE 28

FACE 4: AXISYMMETRIC NON-SPHERICAL FACE

| ORDER | COEFFICIENT |
|---|---|
| 2 | −5.98714E−02 |
| 4 | −8.79294E−05 |
| 6 | 6.71658E−07 |
| 8 | −6.07895E−09 |

TABLE 29

FACE 6: NONAXISYMMETRIC FACE

| | j | |
|---|---|---|
| i | 0 | 2 |
| 0 | 0.00000E+00 | −2.14999E−02 |
| 2 | −2.14999E−02 | −6.85635E−06 |
| 4 | −1.70941E−05 | 2.24226E−07 |
| 6 | 2.34196E−08 | −6.24800E−10 |
| 8 | −3.63128E−10 | −6.00058E−11 |
| 10 | 3.00845E−12 | 0.00000E+00 |

TABLE 30

FACE 7: NONAXISYMMETRIC FACE

| | j | |
|---|---|---|
| i | 0 | 2 |
| 0 | 0.00000E+00 | −3.63850E−03 |
| 2 | −3.63850E−03 | 1.92983E−05 |
| 4 | −1.45967E−06 | 7.62282E−08 |
| 6 | 1.96101E−08 | −6.94163E−10 |
| 8 | −1.02911E−10 | −2.55498E−12 |
| 10 | 3.66571E−13 | 0.00000E+00 |

In the sixth example, at least one face of the glass positive lens $2b$ is formed into an axisymmetric non-spherical face and at least one face of the resin negative lens $2a$ is formed into an axisymmetric non-spherical face; therefore, not only defocusing at the time of a temperature change, but also a change in spherical aberration at the time of a temperature change, can be suppressed. In the sixth example, defocusing per temperature change of 10 degrees becomes about 0.0 mm in both of the calculations in the vicinity of the main light ray and in the entire light rays.

SEVENTH EXAMPLE

A laser scanning device in accordance with a seventh example has the same structure as that of the sixth example except that in the laser scanning device of the sixth example shown in FIG. 22, at least one face (a face on the light-incident side in this example) of the resin negative lens $2a$ of the condensing lens 2 is formed into a nonaxisymmetric face. In the seventh example, the scanning lens 4 is the same as that of the first example. Moreover, the shape in the main-scanning cross section of the condensing lens 2 is the same as that of the example 6.

Table 31 numerically indicates the optical system of the seventh example, and Tables 32 to 35 show face structures (face shapes) of the optical faces of the seventh example. Here, these tables are provided based upon the same definitions as those of the fifth example.

TABLE 31

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 15.00 | 25.98 | 0.00 | −0.5000 | −0.8660 | 0.0000 | 0.8660 | −0.5000 | 0.0000 |
| 2 | LENS (RESIN) | 14.00 | 24.25 | 0.00 | −0.5000 | −0.8660 | 0.0000 | 0.8660 | −0.5000 | 0.0000 |
| 3 | CONDENSING | 13.50 | 23.38 | 0.00 | −0.5000 | −0.8660 | 0.0000 | 0.8660 | −0.5000 | 0.0000 |
| 4 | LENS (GLASS) | 11.50 | 19.92 | 0.00 | −0.5000 | −0.8660 | 0.0000 | 0.8660 | −0.5000 | 0.0000 |
| 5 | RESONANCE MIRROR | 0.00 | 0.00 | 0.00 | −0.8660 | −0.5000 | 0.0000 | 0.5000 | −0.8660 | 0.0000 |
| 6 | SCANNING | 17.36 | 0.00 | 0.00 | 1.0000 | 0.0000 | 0.0000 | 0.0000 | 1.0000 | 0.0000 |
| 7 | LENS | 22.36 | 0.00 | 0.00 | 1.0000 | 0.0000 | 0.0000 | 0.0000 | 1.0000 | 0.0000 |
| 8 | EVALUATION FACE | 278.29 | 0.00 | 0.00 | 1.0000 | 0.0000 | 0.0000 | 0.0000 | 1.0000 | 0.0000 |

TABLE 32

FACE 1: NONAXISYMMETRIC FACE

| | j | | | |
|---|---|---|---|---|
| i | 0 | 2 | 4 | 6 |
| 0 | 0.00000E+00 | −1.95163E−03 | −7.24522E−05 | 5.40458E−06 |
| 2 | −1.95163E−03 | −1.33447E−04 | 1.43731E−05 | 0.00000E+00 |
| 4 | −6.87357E−05 | 1.32136E−05 | 0.00000E+00 | 0.00000E+00 |
| 6 | 5.62099E−06 | 0.00000E+00 | 0.00000E+00 | 0.00000E+00 |
| 8 | −1.43094E−07 | 0.00000E+00 | 0.00000E+00 | 0.00000E+00 |

TABLE 33

FACE 4: AXISYMMETRIC NON-SPHERICAL FACE

| ORDER | COEFFICIENT |
|---|---|
| 2 | −5.98714E−02 |
| 4 | −8.79294E−05 |
| 6 | 6.71658E−07 |
| 8 | −6.07895E−09 |

TABLE 34

FACE 6: NONAXISYMMETRIC FACE

| | j | |
|---|---|---|
| i | 0 | 2 |
| 0 | 0.00000E+00 | −2.14999E−02 |
| 2 | −2.14999E−02 | −6.85635E−06 |
| 4 | −1.70941E−05 | 2.24226E−07 |
| 6 | 2.34196E−08 | −6.24800E−10 |
| 8 | −3.63128E−10 | −6.00058E−11 |
| 10 | 3.00845E−12 | 0.00000E+00 |

TABLE 35

FACE 7: NONAXISYMMETRIC FACE

| | j | |
|---|---|---|
| i | 0 | 2 |
| 0 | 0.00000E+00 | −3.63850E−03 |
| 2 | −3.63850E−03 | 1.92983E−05 |
| 4 | −1.45967E−06 | 7.62282E−08 |
| 6 | 1.96101E−08 | −6.94163E−10 |
| 8 | −1.02911E−10 | −2.55498E−12 |
| 10 | 3.66571E−13 | 0.00000E+00 |

In the seventh example, since at least one face of the resin negative lens 2a is formed into a nonaxisymmetric face, spherical aberration (wave-face aberration) not only in the main-scanning cross section, but also in the sub-scanning cross section can be suppressed as in the fourth example. Additionally, with respect to the defocusing at the time of a temperature change, the seventh example exerts the same effects as the sixth example.

EIGHTH EXAMPLE

Figure 23:
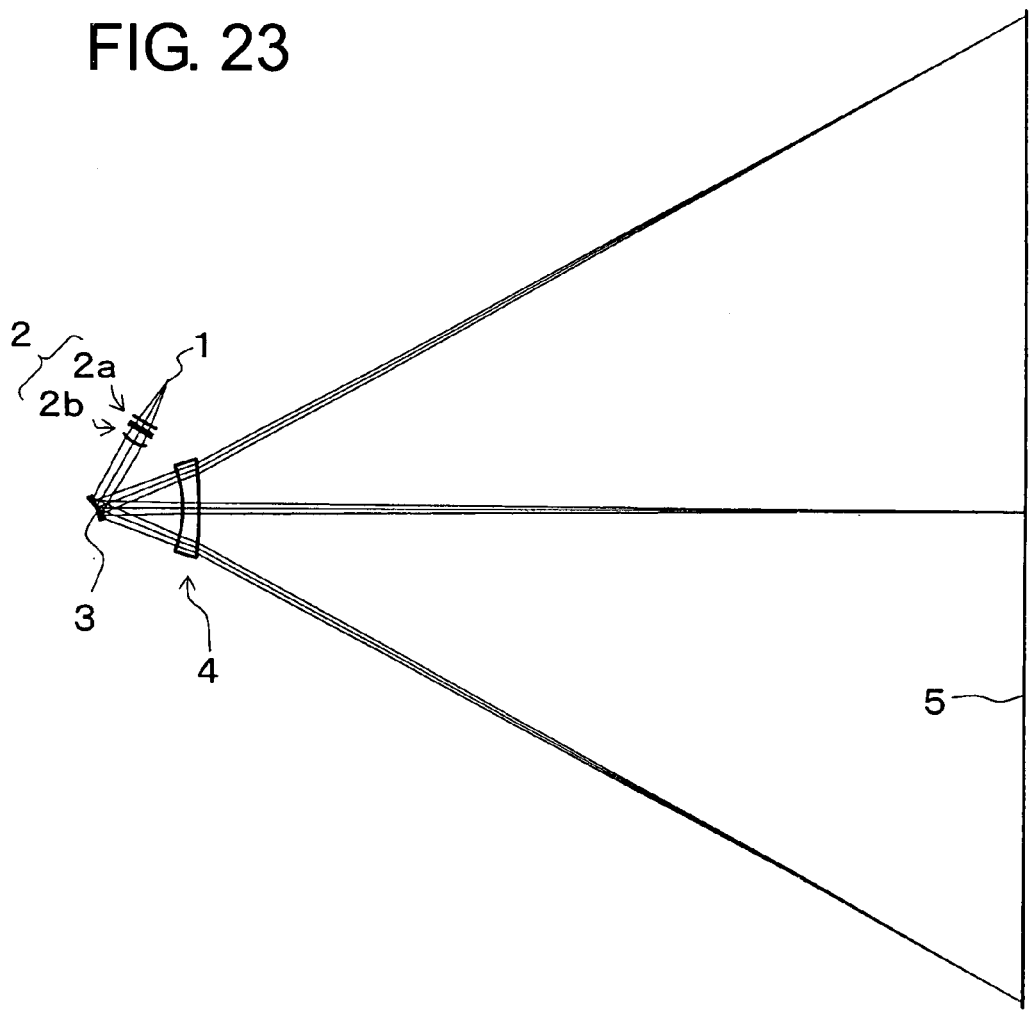
FIG. 23 illustrates a light path in a laser scanning device in accordance with an eighth example.

FIG. 23 shows light paths of a laser scanning device in accordance with an eighth example of the present invention. In the eighth example, the condensing lens 2 is constituted of two lenses, that is, a resin negative lens 2a (resin axisymmetric non-spherical lens) and a glass positive lens 2b (glass axisymmetric non-spherical lens) in the same manner as the sixth example. The resin negative lens 2a is placed closer to the laser light-source 1 side than the glass positive lens 2b. Moreover, the scanning lens 4 has nonaxisymmetric faces on both of the sides.

In the eighth example, the degree of convergence of the incident light onto the scanning lens 4 is alleviated in comparison with the other examples, and the position of the scanning lens 4 is made different from that of the other examples. In other words, in the eighth example, the distance a from the incident position onto the resonance mirror 3 to a position at which light rays deflected by the resonance mirror 3 are converged, if no scanning lens 4 is placed, is about 92 mm. Moreover, the distance b from the resonance mirror 3 to the photosensitive member 5 is set to about 287 mm.

In this example, the deflection angle in the resonance mirror 3 is set in the same manner as the first example. In the eighth example, since the degree of convergence of the incident light onto the scanning lens 4 is alleviated, so that the scanning lens 4 is slightly departed from the resonance mirror 3, with the result that the length of the scanning lens 4 in the main scanning direction is slightly lengthened.

Table 36 numerically indicates the optical system of the eighth example, and Tables 37 to 40 show face structures (face shapes) of the optical faces of the eighth example. Here, these tables are provided based upon the same definitions as those of the fifth example.

TABLE 36

| | | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| FACE | NAME | X | Y | Z | X | Y | Z | X | Y | Z |
| 1 | CONDENSING | 15.00 | 25.98 | 0.00 | −0.5000 | −0.8660 | 0.0000 | 0.8660 | −0.5000 | 0.0000 |
| 2 | LENS (RESIN) | 14.00 | 24.25 | 0.00 | −0.5000 | −0.8660 | 0.0000 | 0.8660 | −0.5000 | 0.0000 |
| 3 | CONDENSING | 13.50 | 23.38 | 0.00 | −0.5000 | −0.8660 | 0.0000 | 0.8660 | −0.5000 | 0.0000 |
| 4 | LENS (GLASS) | 11.50 | 19.92 | 0.00 | −0.5000 | −0.8660 | 0.0000 | 0.8660 | −0.5000 | 0.0000 |
| 5 | RESONANCE MIRROR | 0.00 | 0.00 | 0.00 | −0.8660 | −0.5000 | 0.0000 | 0.5000 | −0.8660 | 0.0000 |
| 6 | SCANNING | 26.95 | 0.00 | 0.00 | 1.0000 | 0.0000 | 0.0000 | 0.0000 | 1.0000 | 0.0000 |
| 7 | LENS | 31.95 | 0.00 | 0.00 | 1.0000 | 0.0000 | 0.0000 | 0.0000 | 1.0000 | 0.0000 |
| 8 | EVALUATION FACE | 286.87 | 0.00 | 0.00 | 1.0000 | 0.0000 | 0.0000 | 0.0000 | 1.0000 | 0.0000 |

TABLE 37

FACE 1: AXISYMMETRIC NON-SPHERICAL FACE

| ORDER | COEFFICIENT |
|---|---|
| 2 | −4.13269E−03 |
| 4 | −3.08405E−06 |
| 6 | 1.74227E−08 |
| 8 | −5.59439E−09 |

TABLE 38

FACE 4: AXISYMMETRIC NON-SPHERICAL FACE

| ORDER | COEFFICIENT |
|---|---|
| 2 | −5.79768E−02 |
| 4 | −7.24140E−05 |
| 6 | −1.80162E−07 |
| 8 | −1.30088E−09 |

TABLE 39

FACE 6: NONAXISYMMETRIC FACE

| | j | |
|---|---|---|
| i | 0 | 2 |
| 0 | 0.00000E+00 | −1.45251E−02 |
| 2 | −1.45251E−02 | 1.80480E−05 |
| 4 | −1.75599E−06 | 9.10394E−08 |
| 6 | 2.85221E−08 | −2.06527E−09 |
| 8 | −2.02957E−10 | 9.28915E−12 |
| 10 | 4.96312E−13 | 0.00000E+00 |

TABLE 40

FACE 7: NONAXISYMMETRIC FACE

| | j | |
|---|---|---|
| i | 0 | 2 |
| 0 | 0.00000E+00 | −3.99850E−03 |
| 2 | −3.99850E−03 | 2.26580E−05 |
| 4 | 2.41616E−06 | 1.35274E−08 |
| 6 | 1.09289E−08 | −5.72963E−10 |
| 8 | −6.27075E−11 | 1.89395E−12 |
| 10 | 1.09632E−13 | 0.00000E+00 |

Figure 24:
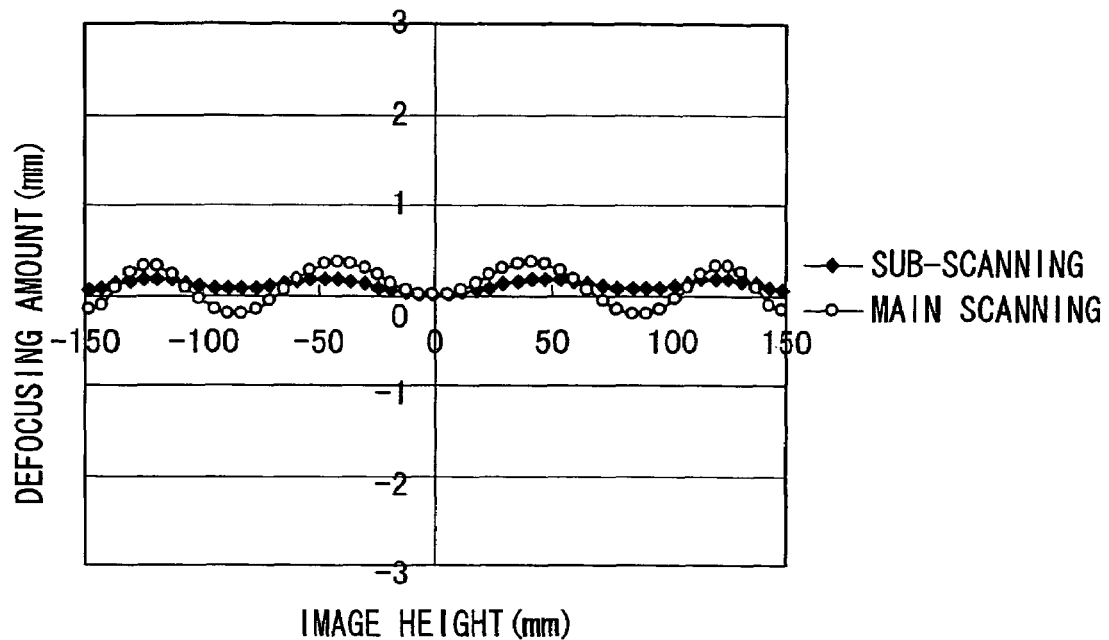
FIG. 24 illustrates an image-face curvature in the eighth example.
Figure 25:
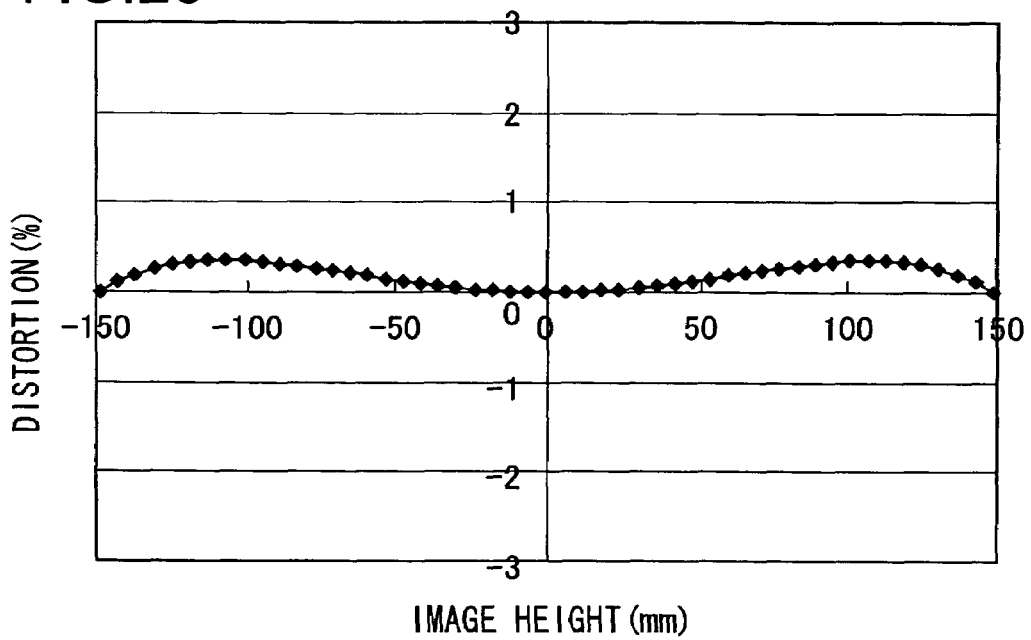
FIG. 25 illustrates a distortion in the eighth example.
Figure 26:
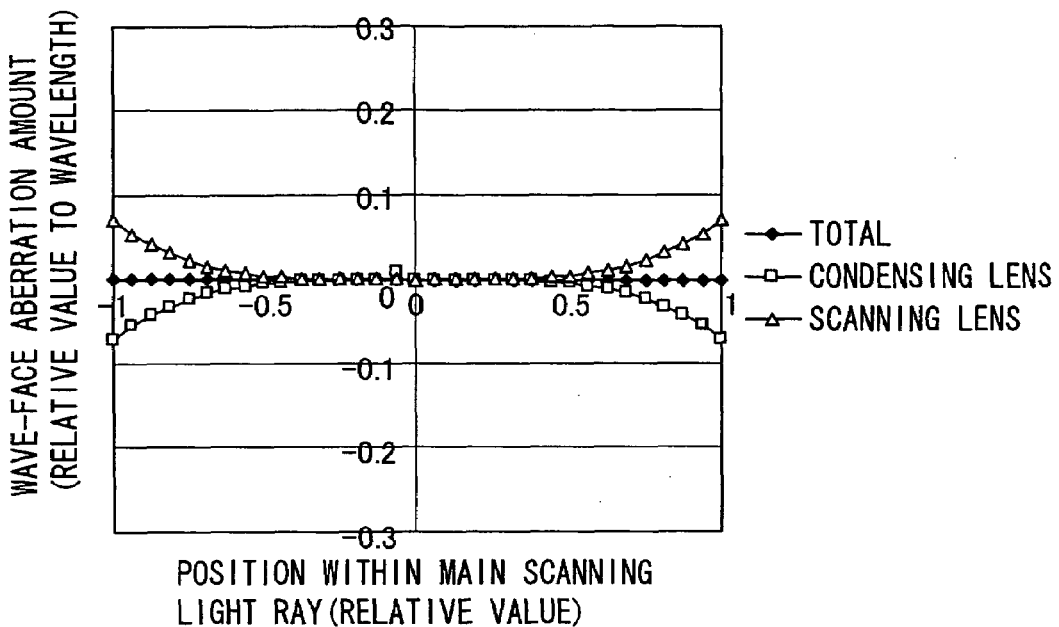
FIG. 26 illustrates spherical aberrations of a condensing lens and a scanning lens within the main-scanning cross section by using wave-face aberrations in the eighth example.
Figure 27:
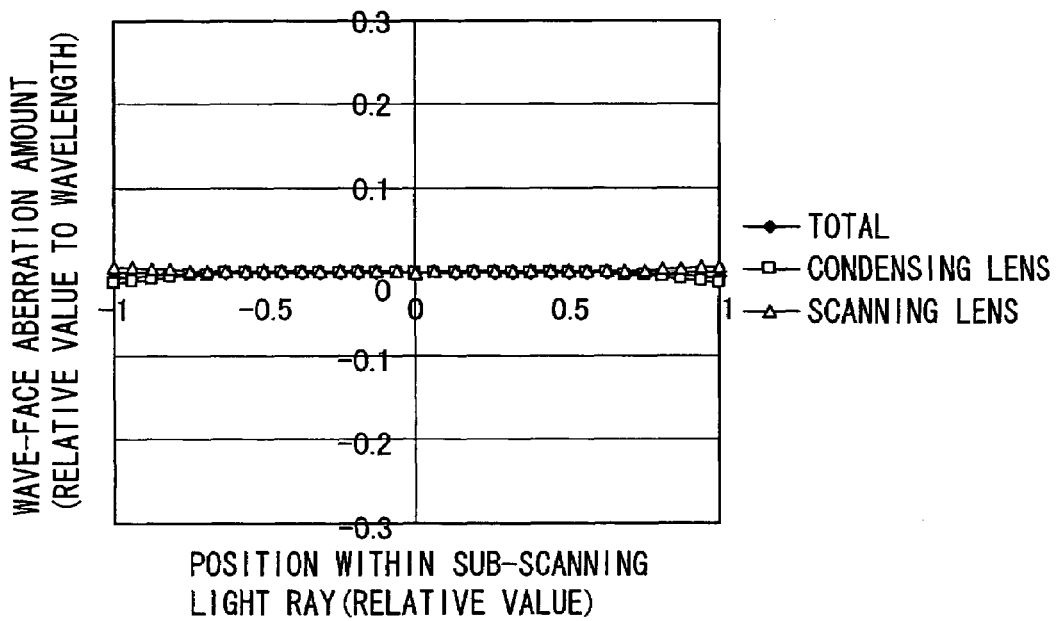
FIG. 27 illustrates spherical aberrations of a condensing lens and a scanning lens within the sub-scanning cross section by using wave-face aberrations in the eighth example.

FIG. 24 shows an image-face curvature in the eighth example, and FIG. 25 shows distortion in the eighth example. Moreover, FIGS. 26 and 27 indicate spherical aberrations of the condensing lens 2 and the scanning lens 4 by using wave-face aberrations (relative values with respect to the wavelength) in the eighth example. Here, FIG. 26 shows the wave-face aberrations within the main-scanning cross section, and FIG. 27 shows the wave-face aberrations within the sub-scanning cross section. In the eighth example, the condensing lens 2 is designed so as to cancel the spherical aberration of the scanning lens 4.

In the eighth example, since the degree of convergence of the incident light onto the scanning lens 4 is alleviated, the spherical aberration of the scanning lens 4 is made smaller than that of the first example. Therefore, the condensing lens 2 is easily designed so as to cancel the spherical aberration of the scanning lens 4.

Figure 28:
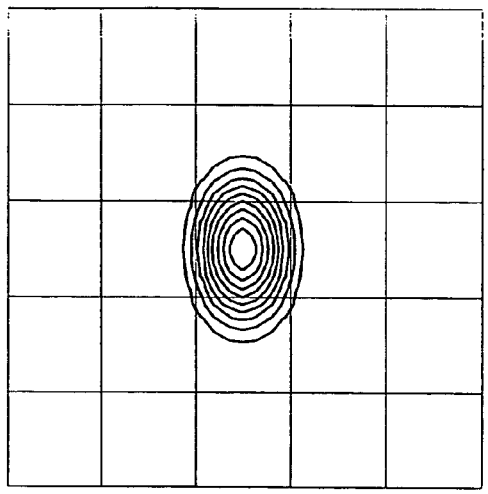
FIG. 28 illustrates a beam shape in the center of an image at a certain moment in the eighth example.
Figure 29:
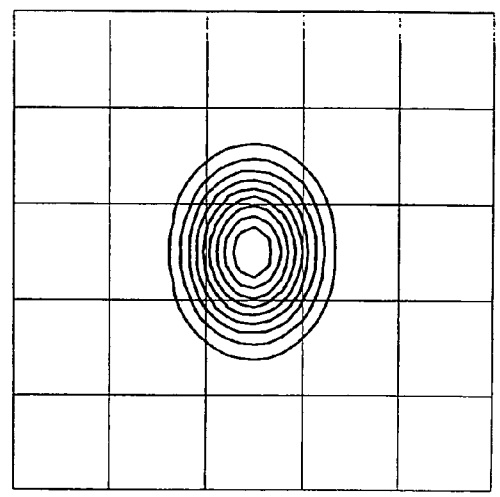
FIG. 29 illustrates a beam shape at an image end portion at a certain moment in the eighth example.
Figure 30:
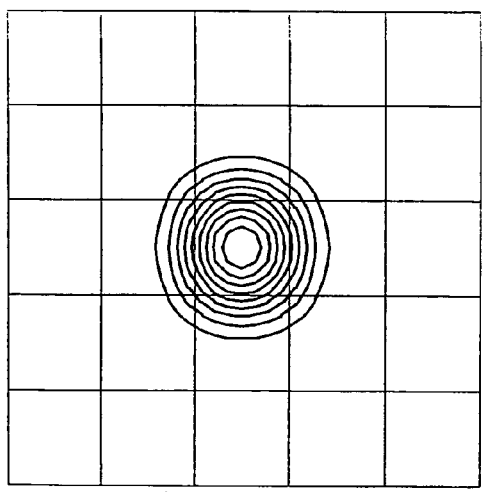
FIG. 30 illustrates a beam shape obtained when the center of an image is scanned for a period of time corresponding to one dot in the eighth example.
Figure 31:
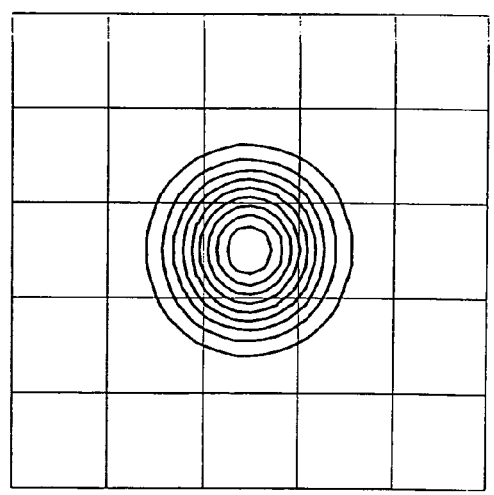
FIG. 31 illustrates a beam shape obtained when the image end portion is scanned for a period of time corresponding to one dot in the eighth example.
Figure 32:
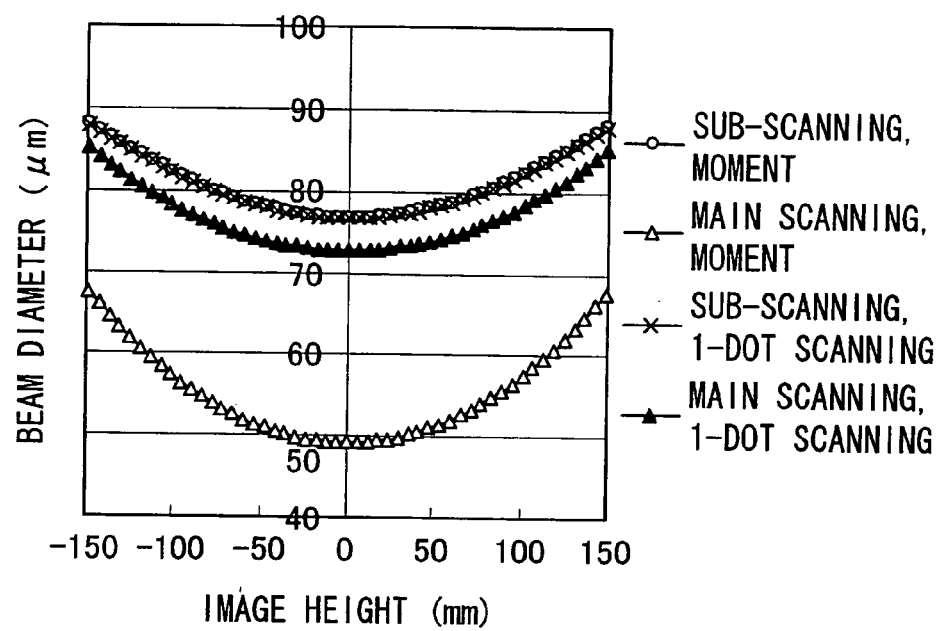
FIG. 32 illustrates a beam diameter in the case of a light intensity of 13.5% of the peak level in the eighth example.

FIGS. 28 to 31 show beam shapes in the eighth example. In these figures, contour lines are drawn with 10% scales with respect to each of peak intensities. FIGS. 28 and 29 show beam shapes at a certain moment, and FIGS. 30 and 31 show beam shapes (results of light energy accumulation) obtained after a scanning process by a period of time corresponding to one dot. Here, FIGS. 28 and 30 show beam shapes in the center of an image, and FIGS. 29 and 31 show beam shapes at an end portion of the image. FIG. 32 shows a beam diameter in the case of a light intensity of 13.5% of the peak level.

In the eighth example, since the degree of convergence of the incident light onto the scanning lens 4 is alleviated in comparison with the other examples, both of the distance a and the distance b are lengthened slightly. However, the optical performances of the scanning lens that are the same level as the first to seventh examples can be obtained. Consequently, the structure of the eighth example also achieves a small-size laser scanning device with high precision in the same manner.

NINTH EXAMPLE

Figure 33:
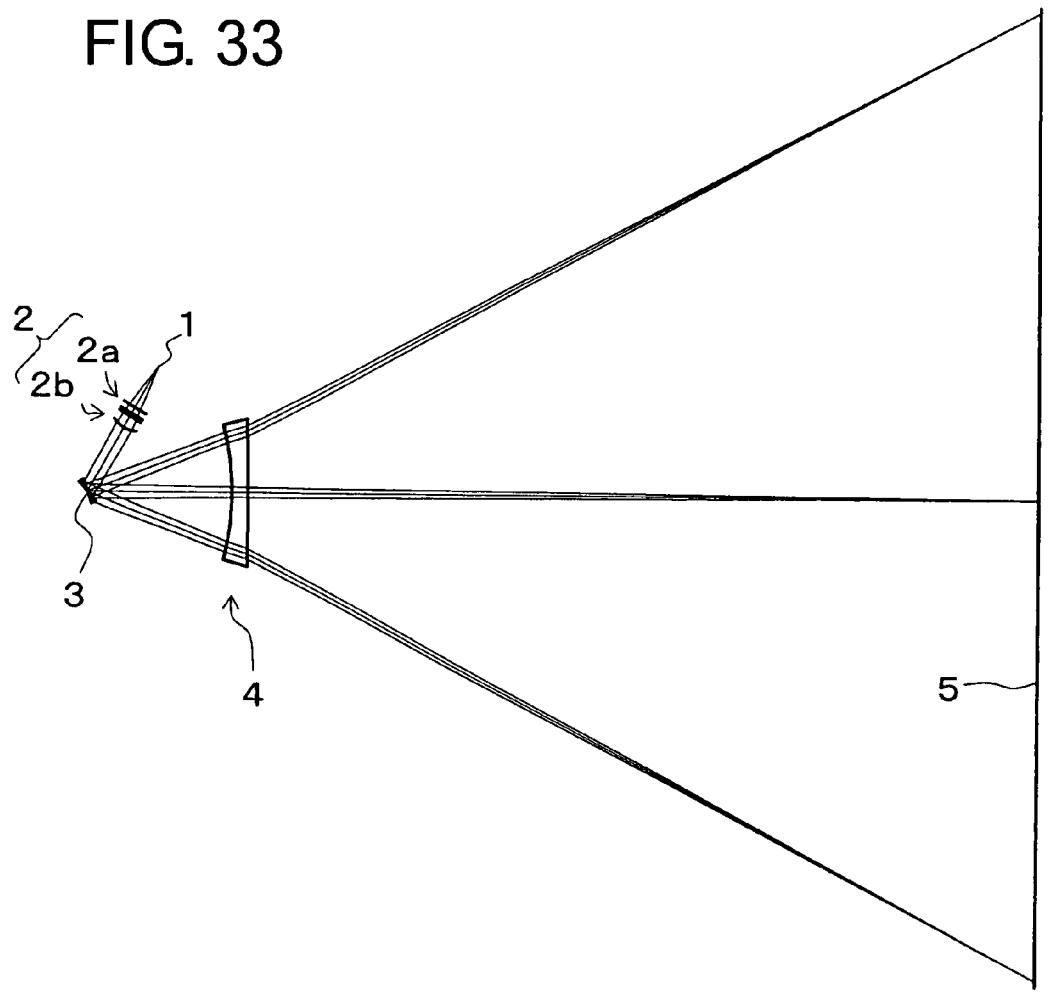
FIG. 33 illustrates a light path in a laser scanning device in accordance with a ninth example.

FIG. 33 shows light paths of a laser scanning device in accordance with a ninth example of the present invention. In the ninth example, the degree of convergence of the incident light onto the scanning lens 4 is further alleviated in comparison with the eighth example. Consequently, the scanning lens 4 is further departed from the resonance mirror 3 in comparison with the eighth example, with the result that the length of the scanning lens 4 in the main scanning direction is further lengthened.

More specifically, in the ninth example, the distance a from the incident position onto the resonance mirror 3 to a position at which light rays deflected by the resonance mirror 3 are converged, if no scanning lens 4 is placed, is about 149 mm. Moreover, the distance b from the resonance mirror 3 to the photosensitive member 5 is set to about 298 mm.

Table 41 numerically indicates the optical system of the ninth example, and Tables 42 to 45 show face structures (face shapes) of the optical faces of the ninth example. Here, these tables are provided based upon the same definitions as those of the fifth example.

TABLE 45

FACE 7: NONAXISYMMETRIC FACE

| | j | |
|---|---|---|
| i | 0 | 2 |
| 0 | 0.00000E+00 | −5.62669E−04 |
| 2 | −5.62669E−04 | 1.04183E−05 |
| 4 | −1.46534E−07 | −1.43502E−08 |
| 6 | 1.24827E−09 | 1.28594E−11 |
| 8 | −1.34053E−12 | −5.84708E−15 |
| 10 | 3.62272E−16 | 0.00000E+00 |

TABLE 41

| FACE | NAME | LOCAL COORDINATES ORIGIN | | | LOCAL COORDINATES X-AXIS VECTOR | | | LOCAL COORDINATES Y-AXIS VECTOR | | |
|---|---|---|---|---|---|---|---|---|---|---|
| | | X | Y | Z | X | Y | Z | X | Y | Z |
| 1 | CONDENSING | 15.00 | 25.98 | 0.00 | −0.5000 | −0.8660 | 0.0000 | 0.8660 | −0.5000 | 0.0000 |
| 2 | LENS (RESIN) | 14.00 | 24.25 | 0.00 | −0.5000 | −0.8660 | 0.0000 | 0.8660 | −0.5000 | 0.0000 |
| 3 | CONDENSING | 13.50 | 23.38 | 0.00 | −0.5000 | −0.8660 | 0.0000 | 0.8660 | −0.5000 | 0.0000 |
| 4 | LENS (GLASS) | 11.50 | 19.92 | 0.00 | −0.5000 | −0.8660 | 0.0000 | 0.8660 | −0.5000 | 0.0000 |
| 5 | RESONANCE MIRROR | 0.00 | 0.00 | 0.00 | −0.8660 | −0.5000 | 0.0000 | 0.5000 | −0.8660 | 0.0000 |
| 6 | SCANNING | 45.52 | 0.00 | 0.00 | 1.0000 | 0.0000 | 0.0000 | 0.0000 | 1.0000 | 0.0000 |
| 7 | LENS | 50.52 | 0.00 | 0.00 | 1.0000 | 0.0000 | 0.0000 | 0.0000 | 1.0000 | 0.0000 |
| 8 | EVALUATION FACE | 298.29 | 0.00 | 0.00 | 1.0000 | 0.0000 | 0.0000 | 0.0000 | 1.0000 | 0.0000 |

TABLE 42

FACE 1: AXISYMMETRIC NON-SPHERICAL FACE

| ORDER | COEFFICIENT |
|---|---|
| 2 | −6.60427E−03 |
| 4 | 2.70405E−06 |
| 6 | 1.82938E−06 |
| 8 | −4.77263E−08 |

TABLE 43

FACE 4: AXISYMMETRIC NON-SPHERICAL FACE

| ORDER | COEFFICIENT |
|---|---|
| 2 | −5.66217E−02 |
| 4 | −7.61197E−05 |
| 6 | 9.96073E−08 |
| 8 | −1.43739E−09 |

TABLE 44

FACE 6: NONAXISYMMETRIC FACE

| | j | |
|---|---|---|
| i | 0 | 2 |
| 0 | 0.00000E+00 | −5.72828E−03 |
| 2 | −5.72828E−03 | 9.99077E−06 |
| 4 | −7.87238E−07 | −1.59699E−08 |
| 6 | 1.61210E−09 | 1.45614E−11 |
| 8 | −1.35332E−12 | −6.61927E−15 |
| 10 | −4.38941E−16 | 0.00000E+00 |

Figure 34:
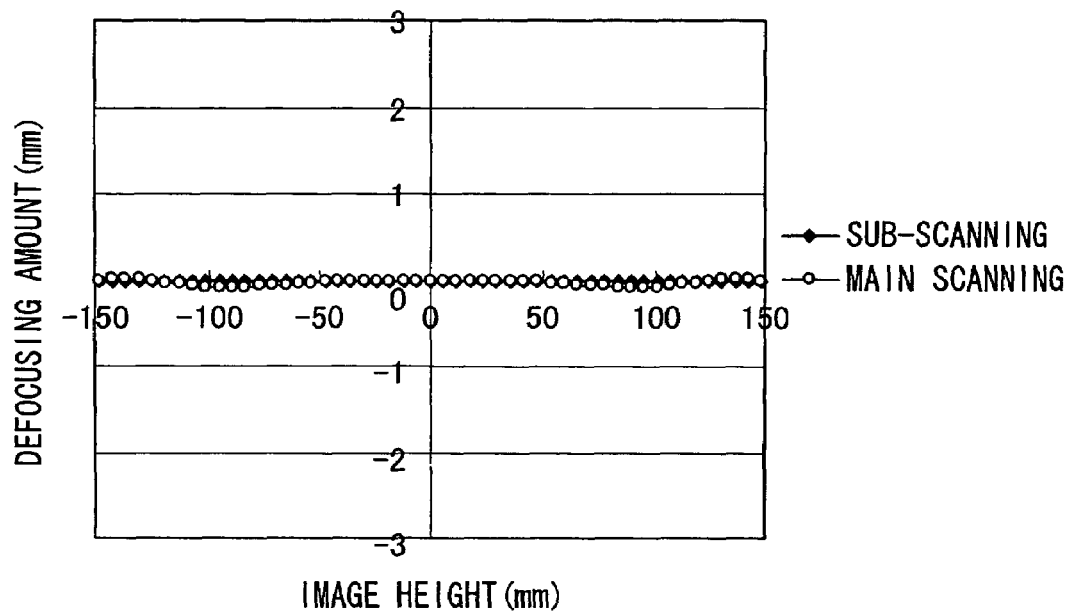
FIG. 34 illustrates an image-face curvature in the ninth example.
Figure 35:
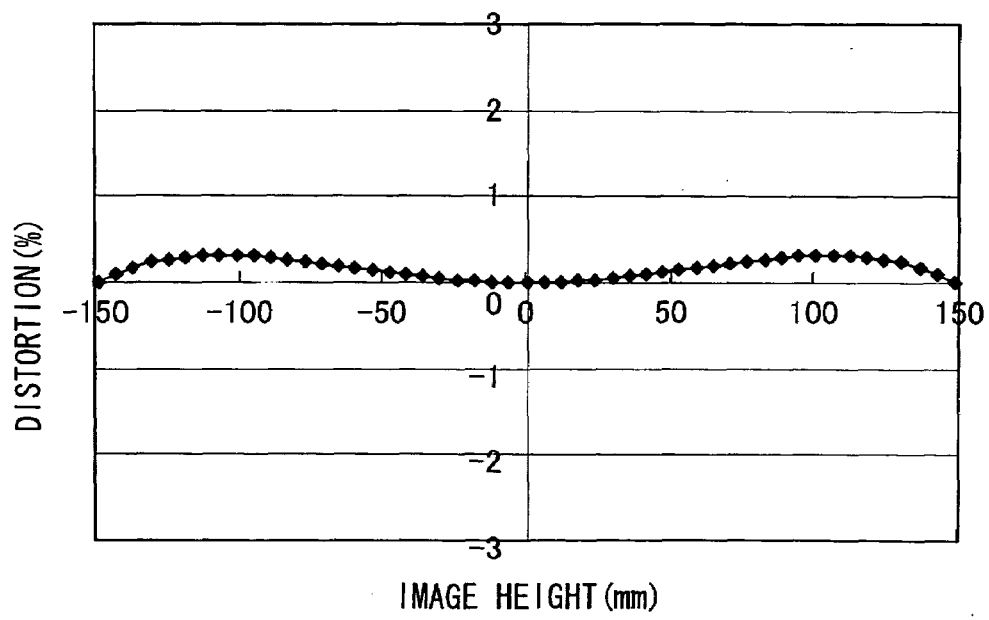
FIG. 35 illustrates a distortion in the ninth example.
Figure 36:
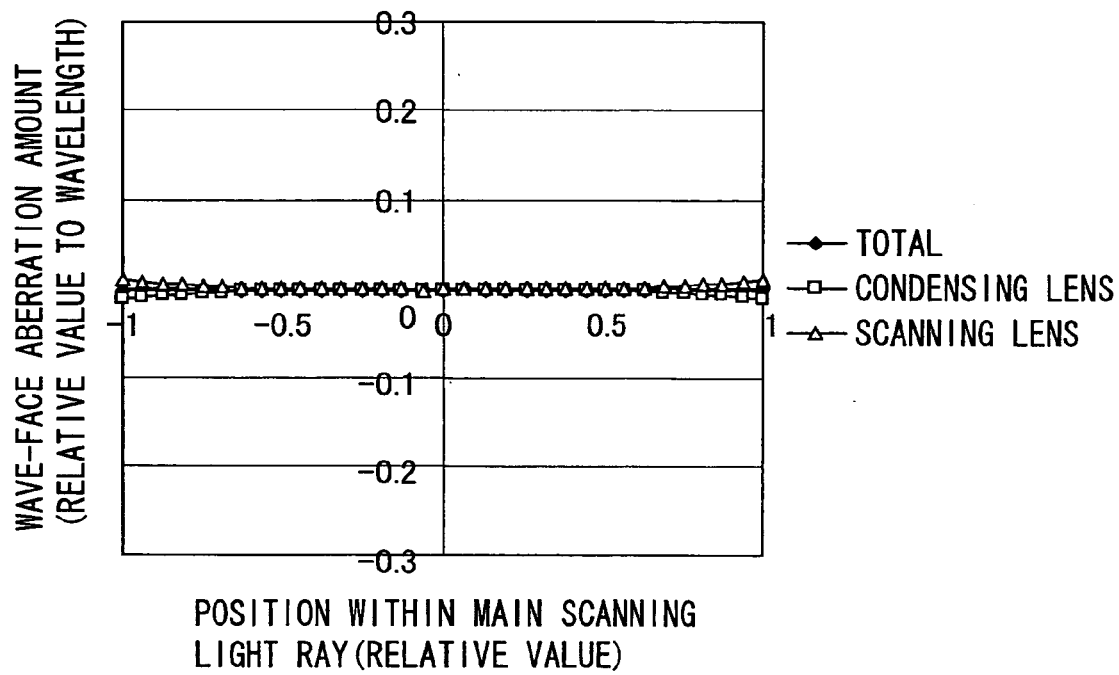
FIG. 36 illustrates spherical aberrations of a condensing lens and a scanning lens within the main-scanning cross section by using wave-face aberrations in the ninth example.
Figure 37:
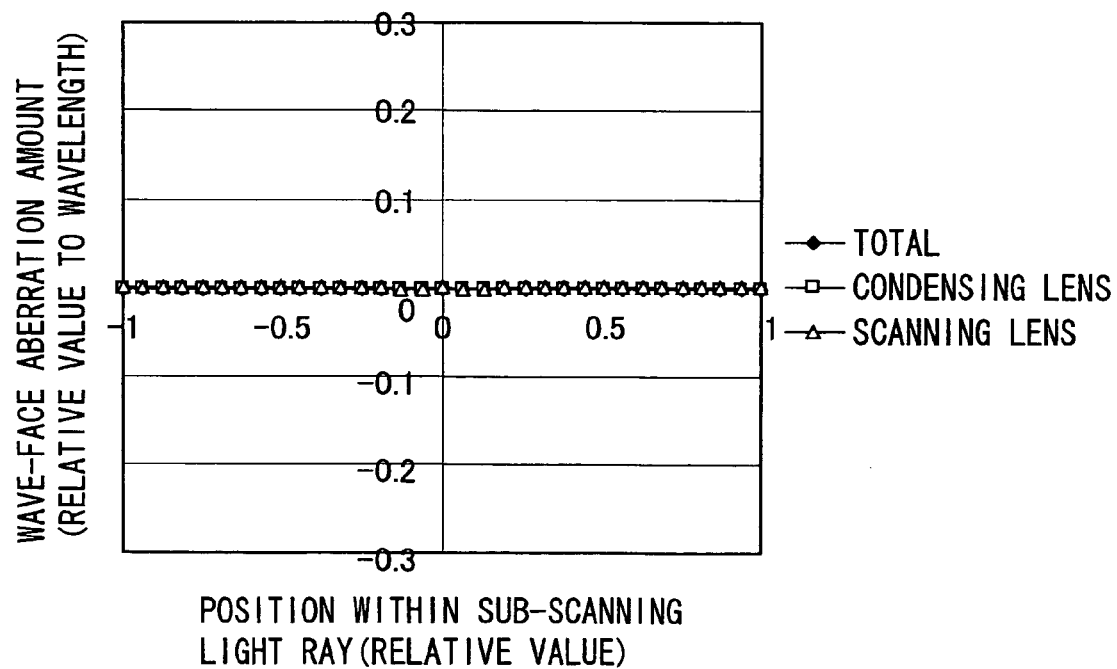
FIG. 37 illustrates spherical aberrations of a condensing lens and a scanning lens within the sub-scanning cross section by using wave-face aberrations in the ninth example.

FIG. 34 shows an image-face curvature in the ninth example, and FIG. 35 shows distortion in the ninth example. FIGS. 36 and 37 indicate spherical aberrations of the condensing lens 2 and the scanning lens 4 by using wave-face aberrations (relative values with respect to the wavelength) in the ninth example. Here, FIG. 36 shows the wave-face aberrations within the main-scanning cross section, and FIG. 37 shows the wave-face aberrations within the sub-scanning cross section. In the ninth example, the spherical aberration generated by the scanning lens 4 is made further smaller in comparison with the eighth example, and the condensing lens 2 is designed so as to cancel the spherical aberration of the scanning lens 4.

Figure 38:
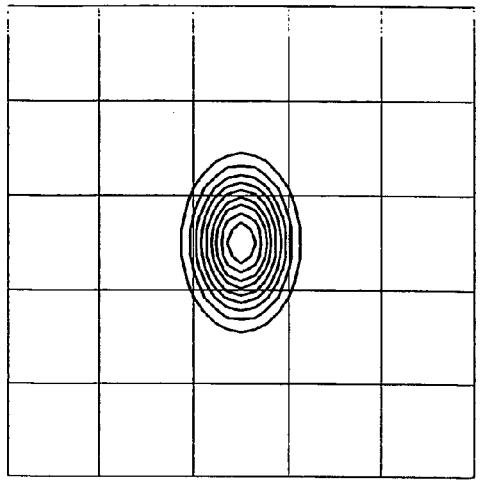
FIG. 38 illustrates a beam shape in the center of an image at a certain moment in the ninth example.
Figure 39:
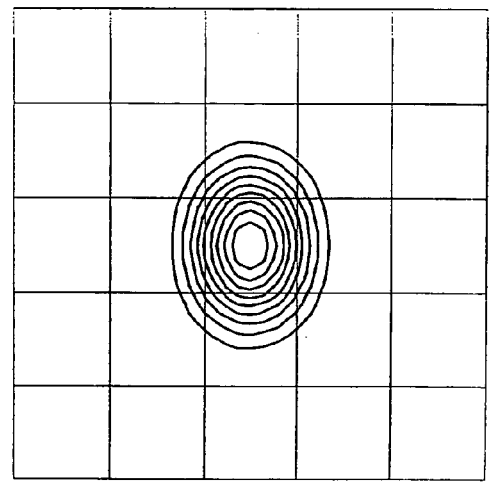
FIG. 39 illustrates a beam shape at an image end portion at a certain moment in the ninth example.
Figure 40:
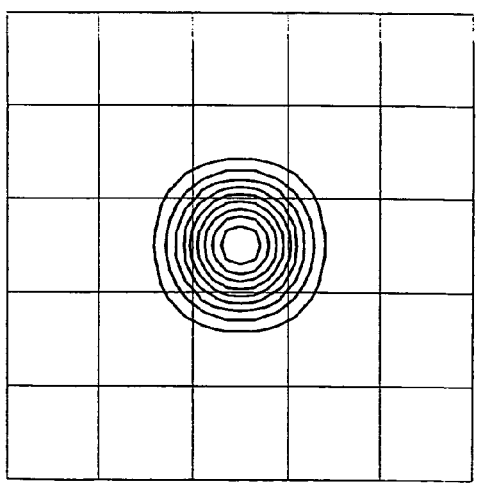
FIG. 40 illustrates a beam shape obtained when the center of an image is scanned for a period of time corresponding to one dot in the ninth example.
Figure 41:
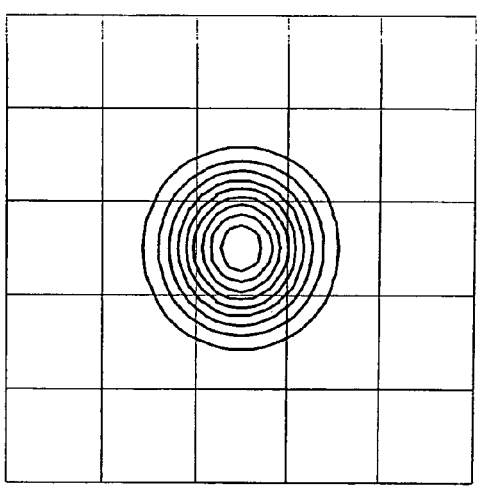
FIG. 41 illustrates a beam shape obtained when the image end portion is scanned for a period of time corresponding to one dot in the ninth example.
Figure 42:
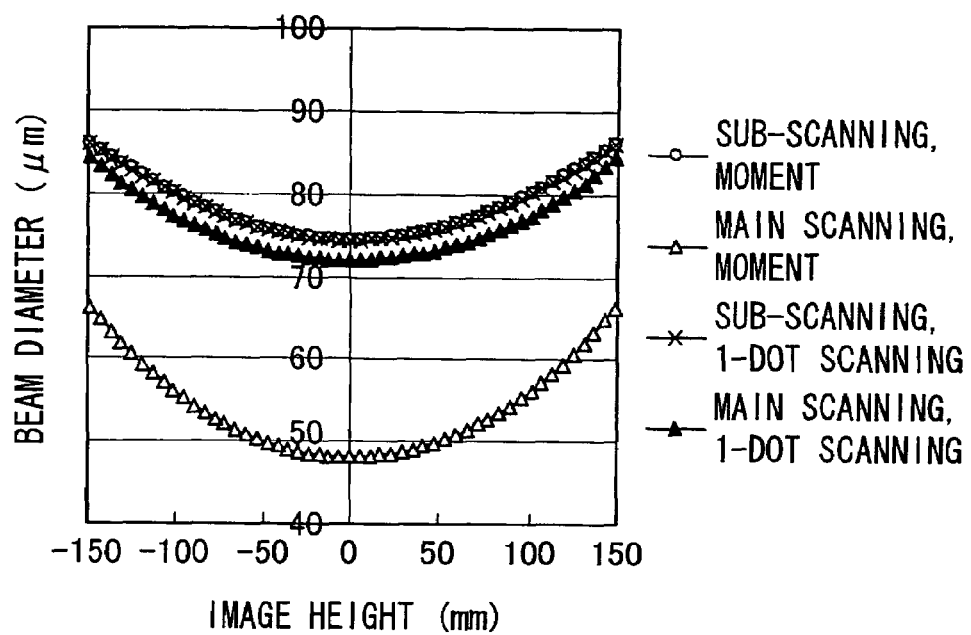
FIG. 42 illustrates a beam diameter in the case of a light intensity of 13.5% of the peak level in the ninth example.

FIGS. 38 to 41 show beam shapes in the ninth example. In these figures, contour lines are drawn with 10% scales with respect to each of peak intensities. FIGS. 38 and 39 show beam shapes at a certain moment, and FIGS. 40 and 41 show beam shapes (results of light energy accumulation) obtained after a scanning process by a period of time corresponding to one dot. Here, FIGS. 38 and 40 show beam shapes in the center of an image, and FIGS. 39 and 41 show beam shapes at an end portion of the image. FIG. 42 shows a beam diameter in the case of a light intensity of 13.5% of the peak level.

In the ninth example, since the degree of convergence of the incident light onto the scanning lens 4 is further alleviated in comparison with the eighth example, both of the distance a and the distance b are lengthened in comparison with the eighth example. However, the optical performances of the scanning lens that are the same level as the first to seventh examples can be obtained. Consequently, the structure of the ninth example also achieves a small-size laser scanning device with high precision in the same manner.

Here, supposing that the degree of convergence of the incident light onto the scanning lens 4 is further alleviated in comparison with the ninth example, both of the distance a and the distance b will be further lengthened to cause the device to enlarge. In the ninth example, 2a<b is satisfied; however, when the degree of convergence of the incident light onto the scanning lens 4 is further alleviated in comparison with the ninth example, it is easily estimated from the descriptions of the first example, the eighth example and the ninth example that 2a≧b be caused. Consequently, it is necessary to satisfy 2a<b in order to achieve a small-size laser scanning device with high precision.

As described above, the laser scanning device of the present invention includes a laser light source, a condenser optical system through which laser light, emitted from the laser light source, is formed into a converged light ray, a deflector which deflects the converged light ray released from the condenser optical system, and a scanning optical system which condenses the laser light, deflected by the deflector, onto a surface to be scanned. Herein, the scanning optical system is constituted of one negative lens, and has at least one nonaxisymmetric face that provides the same power in the vicinity of the light axis in both of a main scanning direction and a sub-scanning direction.

With the above configuration, even when the deflection angle in the deflector is small, it is possible to shorten the distance from the deflector to the surface to be scanned and, also, to miniaturize the unit itself including the deflector and the scanning optical system, with the image-face curvature and the groove-shaped aberration within the sub-scanning cross section being effectively corrected. As a result, a small-size laser scanning device with high precision can be achieved.

In the laser scanning device of the present invention, preferably, the deflector is constituted of a resonance mirror which deflects laser light by sine-wave rocking a reflection face, and the scanning optical system is aberration-corrected so that the surface to be scanned is scanned at a constant speed with the laser light that has been deflected by the resonance mirror.

With this configuration of the scanning optical system, even when a resonance mirror is used as the deflector, the face to be scanned can be scanned at a constant speed with the laser light that has been deflected by the resonance mirror.

In the laser scanning device of the present invention, when a distance from a position at which the converged light ray is made incident in the deflector to a position at which the light ray is converged if no scanning optical system is placed is defined as "a" and a distance from the deflector to the face to be scanned is defined as "b", the following inequality is preferably satisfied:

2a<b.

When this condition is satisfied, the degree of convergence of the incident light onto the scanning optical system can be alleviated within a range in which the size-reducing effect for the device is not impaired. Thus, it is possible to suppress the spherical aberration of the scanning optical system and, consequently, to easily design a condenser optical system capable of canceling the spherical aberration.

In the laser scanning device of the present invention, the negative lens may have a convex meniscus shape that extends toward the face to be scanned. In this case, it is possible to allow the scanning optical system to easily exert an arcsine scanning characteristic.

In the laser scanning device of the present invention, a face of the negative lens on the deflector side may be formed into an axisymmetric non-spherical face. In this case, in comparison with the case where the face of the negative lens on the side of the face to be scanned is formed into an axisymmetric non-spherical face, it becomes possible to effectively correct the groove-shaped aberration.

In the laser scanning device of the present invention, both faces of the negative lens may be formed into nonaxisymmetric faces. In this case, it becomes possible to ensure the image-face curvature correction and the groove-shaped aberration correction within the sub-scanning cross section.

In the laser scanning device of the present invention, the condenser optical system is preferably designed to have a spherical aberration having a sign reversed to that of the spherical aberration of the scanning optical system within the main-scanning cross section. In this case, the spherical aberration of the scanning optical system can be cancelled by the spherical aberration of the condenser optical system, making it possible to correct the spherical aberration systematically.

In the laser scanning device of the present invention, the scanning optical system may be made of resin, and the condenser optical system may be constituted of two lenses, that is, a glass positive lens and a resin negative lens. With this configuration, it is possible to suppress defocusing at the time of a temperature change.

In the laser scanning device of the present invention, at least one face of the glass positive lens may be formed into a spherical face, and at least one face of the resin negative lens may be formed into an axisymmetric non-spherical face. By forming the glass positive lens into a spherical lens, it is possible to reduce costs. Moreover, since at least one face of the resin negative lens is formed into the axisymmetric non-spherical face, the spherical aberration, caused by the glass positive lens, can be corrected by the resin negative lens.

In the laser scanning device of the present invention, at least one face of the glass positive lens may be formed into a spherical face, and at least one face of the resin negative lens may be formed into a nonaxisymmetric face. By forming the glass positive lens into a spherical lens, it is possible to reduce costs. Moreover, since at least one face of the resin negative lens is formed into the nonaxisymmetric face, the spherical aberration within the sub-scanning cross section can be suppressed.

In the laser scanning device of the present invention, at least one face of the glass positive lens may be formed into an axisymmetric non-spherical face, and at least one face of the resin negative lens may be formed into an axisymmetric non-spherical face. In this case, it becomes possible to suppress not only defocusing at the time of a temperature change, but also a change in the spherical aberration at the time of a temperature change.

In the laser scanning device of the present invention, at least one face of the glass positive lens may be formed into an axisymmetric non-spherical face, and at least one face of the resin negative lens may be formed into a nonaxisymmetric face. In this case, it becomes possible to suppress the spherical aberration within the sub-scanning cross section.

In the laser scanning device of the present invention, the scanning optical system may be made of resin, and the condenser optical system may be constituted of one glass positive lens. With this configuration, it is possible to simplify a device structure in comparison with the condenser optical system which is constituted of two lenses, that is, a glass positive lens and a resin negative lens.

In the laser scanning device of the present invention, at least one face of the glass positive lens may be formed into an axisymmetric non-spherical face. In this case, the spherical aberration of the scanning optical system within the main-scanning cross section can be easily cancelled by the spherical aberration of the condenser optical system, thereby making it possible to correct the spherical aberration within the main-scanning cross section as a whole.

In the laser scanning device of the present invention, at least one face of the glass positive lens may be formed into an axisymmetric non-spherical face. In this case, the spherical aberration of the scanning optical system within the main-scanning cross section and within the sub-scanning cross section can be easily cancelled by the spherical aberration of the condenser optical system, thereby making it possible to correct the spherical aberration within the main-scanning cross section and within the sub-scanning cross section as a whole.

The invention being thus described, it will be obvious that the same may be many ways. Such variations are not to be regarded as a departure from the scope of the invention, and all such modifications as would be obvious to one the art are intended to be included within the scope of the following claims.

What is claimed is:

1. A laser scanning device comprising:
   a laser light source;
   a condenser optical system through which laser light, emitted from the laser light source, is formed into a converged light ray;
   a deflector which deflects the converged light ray released from the condenser optical system; and
   a post-deflection scanning optical system which condenses the laser light, deflected by the deflector, onto a surface to be scanned, wherein
   the scanning optical system is constituted of only one negative lens, and has at least one nonaxisymmetric face that provides the same dioptric power at the light axis in both a main scanning direction and a sub-scanning direction.

2. The laser scanning device according to claim 1, wherein
   the deflector is constituted of a resonance mirror which deflects the laser light by sine-wave rocking a reflection face, and
   the scanning optical system is aberration-corrected so that the laser light deflected by the resonance mirror is allowed to scan a face to be scanned at a constant speed.

3. The laser scanning device according to claim 1, wherein
   when a distance from a position at which the converged light ray is made incident in the deflector to a position at which the light ray is converged if no scanning optical system is placed is defined as "a" and a distance from the deflector to the face to be scanned is defined as "b", the following inequality is satisfied:

$2a < b$.

4. The laser scanning device according to claim 1, wherein
   the negative lens has a convex meniscus shape that extends toward the face to be scanned.

5. The laser scanning device according to claim 1, wherein
   a face of the negative lens on the deflector side is formed into an axisymmetric non-spherical face.

6. The laser scanning device according to claim 1, wherein
   both faces of the negative lens are formed into nonaxisymmetric faces.

7. The laser scanning device according to claim 1, wherein
   the condenser optical system is designed to have a spherical aberration having a sign reversed to that of the spherical aberration of the scanning optical system within a main-scanning cross section.

8. The laser scanning device according to claim 1, wherein
   the scanning optical system is made of resin, and
   the condenser optical system is constituted of two lenses, that is, a glass positive lens and a resin negative lens.

9. The laser scanning device according to claim 8, wherein
   at least one face of the glass positive lens is formed into a spherical face, and
   at least one face of the resin negative lens is formed into an axisymmetric non-spherical face.

10. The laser scanning device according to claim 8, wherein
    at least one face of the glass positive lens is formed into a spherical face, and
    at least one face of the resin negative lens is formed into a nonaxisymmetric face.

11. The laser scanning device according to claim 8, wherein
    at least one face of the glass positive lens is formed into an axisymmetric non-spherical face, and
    at least one face of the resin negative lens is formed into an axisymmetric non-spherical face.

12. The laser scanning device according to claim 8, wherein
    at least one face of the glass positive lens is formed into an axisymmetric non-spherical face, and
    at least one face of the resin negative lens is formed into a nonaxisymmetric face.

13. The laser scanning device according to claim 1, wherein
    the scanning optical system is made of resin, and
    the condenser optical system is constituted of one glass positive lens.

14. The laser scanning device according to claim 13, wherein
    at least one face of the glass positive lens is formed into an axisym metric non-spherical face.

15. The laser scanning device according to claim 13, wherein
    at least one face of the glass positive lens is formed into a nonaxisymmetric face.

* * * * *